United States Patent
Senn et al.

(10) Patent No.: US 10,167,143 B2
(45) Date of Patent: Jan. 1, 2019

(54) DEVICE AND METHOD FOR MOVING TRANSPORT ELEMENTS IN A CONTAINER TREATMENT SYSTEM

(71) Applicant: KRONES AG, Neutraubling (DE)

(72) Inventors: Konrad Senn, Regensburg (DE); Matthias Wahl, Langquaid (DE); Toni Hifinger, Regensburg (DE); Ralf Walter, Zeitlarn (DE)

(73) Assignee: KRONES AG, Neutraubling (DE)

( * ) Notice: Subject to any disclaimer, the term of this patent is extended or adjusted under 35 U.S.C. 154(b) by 260 days.

(21) Appl. No.: 14/913,224

(22) PCT Filed: Aug. 13, 2014

(86) PCT No.: PCT/EP2014/067299
§ 371 (c)(1),
(2) Date: Feb. 19, 2016

(87) PCT Pub. No.: WO2015/036196
PCT Pub. Date: Mar. 19, 2015

(65) Prior Publication Data
US 2016/0207717 A1    Jul. 21, 2016

(30) Foreign Application Priority Data
Sep. 13, 2013   (DE) .................. 10 2013 218 391

(51) Int. Cl.
*B65G 43/10* (2006.01)
*B65G 37/02* (2006.01)
*B65G 54/02* (2006.01)

(52) U.S. Cl.
CPC ............ *B65G 43/10* (2013.01); *B65G 37/02* (2013.01); *B65G 54/02* (2013.01); *B65G 2811/0673* (2013.01)

(58) Field of Classification Search
USPC ........................................ 700/214
See application file for complete search history.

(56) References Cited

U.S. PATENT DOCUMENTS

| | | | | |
|---|---|---|---|---|
| 4,040,533 A | * | 8/1977 | De Boer | B01L 9/06 198/346.2 |
| 5,287,677 A | * | 2/1994 | Hunter | B65B 17/025 53/398 |

(Continued)

FOREIGN PATENT DOCUMENTS

| | | |
|---|---|---|
| CN | 102858664 A | 1/2013 |
| DE | 4133114 A1 | 4/1993 |

(Continued)

OTHER PUBLICATIONS

Notification of the First Office Action for Chinese application No. 201480061791.7, The State Intellectual Property Office of P.R. China, dated Mar. 2, 2017.

(Continued)

*Primary Examiner* — Kyle O Logan
(74) *Attorney, Agent, or Firm* — Marshall, Gerstein & Borun LLP

(57) ABSTRACT

A method for adapting motion profiles of a plurality of individually controllable transport elements for transporting containers in a container treatment system along a transport path, wherein the plurality of transport elements are movably arranged along the transport path, the method includes the following steps: determining a treatment state of at least one container carried along by a first transport element, and/or determining an operational state of at least one first container treatment unit which is arranged downstream with respect to a position of the first transport element along the transport path, wherein the first transport element is moved by an open- and/or closed-loop control unit of the container treatment system as part of a stream of transport elements, (Continued)

and wherein the motion profile of the first transport element is adapted by the open- and/or closed-loop control unit in response to the determined treatment state and/or the determined operational state.

32 Claims, 8 Drawing Sheets

(56) References Cited

U.S. PATENT DOCUMENTS

| | | | | |
|---|---|---|---|---|
| 5,546,819 A * | 8/1996 | Zodrow | ................. | B07C 5/122 |
| | | | | 73/863.91 |
| 6,227,351 B1 * | 5/2001 | Leisner | ................. | B65G 37/02 |
| | | | | 198/460.1 |
| 6,450,319 B1 * | 9/2002 | Reist | ...................... | B65G 35/08 |
| | | | | 104/103 |
| 8,827,071 B2 | 9/2014 | van de Loecht | | |
| 2003/0149509 A1 * | 8/2003 | Udou | ................. | B65G 1/0485 |
| | | | | 700/213 |
| 2007/0107212 A1 * | 5/2007 | Holliger | ............... | B23P 19/041 |
| | | | | 29/772 |
| 2010/0289892 A1 * | 11/2010 | Kwirandt | .......... | G01N 21/9045 |
| | | | | 348/127 |
| 2011/0064266 A1 * | 3/2011 | Zech | ................... | B07C 5/3422 |
| | | | | 382/100 |
| 2011/0226381 A1 * | 9/2011 | Raith | ...................... | B67C 3/02 |
| | | | | 141/1 |
| 2012/0055758 A1 * | 3/2012 | Huttner | ............... | B65G 23/18 |
| | | | | 198/469.1 |
| 2012/0211330 A1 * | 8/2012 | Ziegler | ............... | B65G 43/10 |
| | | | | 198/464.4 |
| 2013/0026011 A1 | 1/2013 | van de Loecht | | |
| 2013/0173146 A1 * | 7/2013 | Atmur | ..................... | B61B 13/12 |
| | | | | 701/117 |
| 2013/0310969 A1 * | 11/2013 | Terzini | ................ | G06F 19/3462 |
| | | | | 700/235 |
| 2014/0311861 A1 | 10/2014 | Hausladen et al. | | |

FOREIGN PATENT DOCUMENTS

| | | |
|---|---|---|
| DE | 19532281 A1 | 3/1997 |
| DE | 102004048515 A1 | 4/2006 |
| DE | 102006002644 A1 | 7/2007 |
| DE | 102009058659 A1 | 6/2011 |
| DE | 1020100297625 A1 | 10/2011 |
| DE | 102011055780 A1 | 5/2013 |
| DE | 102012200951 A1 | 7/2013 |
| EP | 1352817 A1 | 10/2003 |
| JP | H0551087 A | 3/1993 |
| JP | 2000238633 A | 9/2000 |
| JP | 2006052037 A | 2/2006 |
| JP | 2010132405 A | 6/2010 |
| WO | WO-99/54244 A1 | 10/1999 |
| WO | WO-2005/110898 A2 | 11/2005 |
| WO | WO-2005118436 A1 | 12/2005 |

OTHER PUBLICATIONS

German Search Report for Application No. 102013218391.7, dated Aug. 26, 2014.
Extended Search Report for European Patent Application EP 18 159 372, dated Jun. 18, 2018.
Partial Search Report for European Patent Application EP 18 159 369, dated Jun. 7, 2018.
International Search Report for International Application No. PCT/EP2014/067299, dated Apr. 14, 2015.

* cited by examiner

DEVICE AND METHOD FOR MOVING TRANSPORT ELEMENTS IN A CONTAINER TREATMENT SYSTEM

CROSS-REFERENCE TO RELATED APPLICATION

The present application is a US national phase of International Patent Application No. PCT/EP2014/067299, filed Aug. 13, 2014, which application claims priority to German Application No. DE 102013218391.7, filed Sep. 13, 2013. The priority application, DE 102013218391.7, is hereby incorporated by reference.

FIELD OF THE DISCLOSURE

The present invention refers to a device and a method for the controlled movement of individually controllable transport elements for transporting containers, in particular bottles or cans, in a container treatment system.

PRIOR ART

In container treatment systems, containers, such as bottles, cans, etc., are treated in one or several successive process steps. The process steps or work steps are in general carried out in separate treatment units that can for instance be arranged as modules of a common system concept. To reduce the costs for the purchase and operation of the system, interfaces for the control of the system, for media supply, or the like, are usually standardized to simplify the combination of treatment units of different types and/or production capacities. A container treatment system for plastic bottles, e.g. of polyethylene terephthalate (PET), polypropylene (PEP), etc., may for instance comprise a heating device for heating the preforms, a stretch blow molder for expanding and stretching the preforms into plastic bottles, a cleaning device, a labeling device, a filling device, a sorting device, a packaging device, a sterilization device, an inspection device, a temperature control device, a cooling device, a coating device, a buffering device, etc. as separate, module-type treatment units. The individual treatment units which carry out successive process steps are generally connected in series one after the other in the prior art, with one or more transport devices handling the transportation of the containers from the treatment units to the respective downstream treatment units.

The conduction of successive process steps by the separate treatment units of the system as well as the transportation between the treatment units thus comply with the known assembly-line processing principle in which a continuous flow of containers, which are to be treated, through the series-arranged treatment units is achieved by way of suitable control processes regarding the process duration of the individual process steps and/or the amount of the containers transported per time unit from one treatment unit to the next treatment unit. In the systems known in the prior art, the transportation of the containers between the treatment units is often carried out by means of a plurality of separate transport elements in the form of carriers which receive the containers or preforms by way of suitable holding devices, e.g. specifically formed gripping units, at a receiving point, transport them through the series of successive treatment units, and finally discharge them at a discharge point. The containers are here in general transferred by suitably designed feed conveyors at the receiving points to the plurality of transport elements and taken over in a corresponding manner by suitably designed removal conveyors at the discharge points from the plurality of transport elements. The feed conveyor and also the removal conveyor as well as the individual container treatment units transport or treat the containers at a rate of containers per time unit that is predetermined by the operating personnel or a control device in response to the container to be treated, the process step and/or the operating treatment unit. In other words, for an uninterrupted and efficient production, containers must arrive at the respective treatment unit or conveying device at predetermined, constant time intervals or at a constant predetermined speed of the transport elements at predetermined, constant spatial distances, the so-called division of a (product) stream. Although the processing rate of the individual treatment units and/or the conveying rates of the conveying devices can typically be controlled or regulated within certain limits, deviations from the predetermined rate, i.e. from the predetermined time interval or from the predetermined spatial distance between two successive transport elements, lead in general to production delays because the processing rates of the individual treatment units can only be adapted with a time delay.

Especially gaps in the otherwise regular production stream of containers pose great difficulties for the control or regulation of treatment units because these must temporarily operate with a delay upon occurrence of a gap to be subsequently run again at normal speed. Precious production time is here in general lost. The formation of gaps in the production stream of container treatment systems is however an everyday phenomenon, the gaps being for instance formed due to the recognition of the treatment state of containers as being faulty and due to the ejection of the containers.

Hence, it is the object of the present invention to provide an improved method for the individual control of the transport elements of a transport device in a container treatment system that overcomes the above-mentioned drawbacks and particularly permits an efficient gap processing of the container treatment system.

In container treatment systems comprising a plurality of series-arranged container treatment units for carrying out successive process steps, already the failure of a single treatment unit may lead to a standstill of the whole process line and thus to considerable production loss. To reduce production loss, intermediate buffers for transport elements and their containers carried along are often provided in the prior art, and these partly necessitate a considerable increase in the construction size of the treatment system. On the other hand, the sequence of the process steps in the process line is often not mandatory. For instance, a control mark can be glued to a container before and also after a labeling step. Hence, it would be desirable to prefer process steps which can be carried out independently upon failure of a special treatment unit, so that at least a part of the process line following the failed treatment unit can be further operated. Failure does here not necessarily mean complete standstill of the treatment unit, but may already occur due to a temporary reduction of the throughput of containers.

Hence, it is also the object of the present invention to provide an improved method for the individual control of the transport elements of a transport device in a container treatment system which overcomes the above-mentioned drawbacks and particularly permits a continuous operation of parts of the process line in case of failure of a treatment unit.

A transport device for the individual control of a plurality of individually controllable transport elements usually comprises a transport path which by means of interaction elements mounted along the transport path exerts a force on reaction elements mounted on the transport elements by way of mechanical and/or electromagnetic interaction. By selective control of the reaction element of a specific transport element and/or of one or plural interaction elements within a defined area of the transport path, this exertion of force can be restricted to a specific transport element, whereby the transport element can be guided individually and independently of other transport elements along the transport path. By way of interaction the transport element can here be accelerated, decelerated or guided at a constant speed along the transport path. In general, the reaction elements of the individually controllable transport elements, particularly in the case of electromagnetic interaction, are designed such that a repulsive interaction is achieved between two transport elements that are adjacent along the transport path, so that collisions are avoided or at least attenuated. Therefore, the distance of such neighboring transport elements can only be reduced against this repulsive force.

In specific situations in the course of the production process, e.g. when several containers are processed into a unit or pack, and in case of a synchronous transportation of a plurality of transport elements along rather long transport routes and at a high processing or feed rate of individual container units or conveyors, respectively, it may however be desirable to jointly guide, i.e. at a constant distance, neighboring transport elements without any gap, i.e. at a minimal distance which depends on the form of the transport elements and/or of the transported containers. Due to the repulsive force between the reaction elements of neighboring transport elements, this, however, requires additional energy for such a gapless running.

Hence, it is further the object of the present invention to allow a synchronous running of neighboring transport elements in an energy-efficient manner.

DESCRIPTION OF THE INVENTION

The above-mentioned objects are achieved with a method for automatically adapting motion profiles of a plurality of individually controllable transport elements for transporting containers in a container treatment system along a transport path, wherein the plurality of transport elements are movably arranged along the transport path, the method comprising the following steps: determining a treatment state of at least one container carried along by a first transport element among the plurality of the transport elements, and/or determining an operational state of at least one first container treatment unit which is arranged downstream along the transport path with respect to a position of the first transport element, wherein the first transport element is moved by means of an open- and/or closed-loop control unit of the container treatment system as part of a stream of transport elements, and wherein the motion profile of the first transport element is adapted by means of the open- and/or closed-loop control unit in response to the determined treatment state and/or to the determined operational state.

The transport path and the plurality of individually controllable transport elements that are movably arranged on the transport path may be part of a transport device that transports the containers from a receiving point or a container treatment unit to a container treatment unit or a discharge point that are arranged downstream in the process. Transport devices are understood here and in the following to be conveyors that comprise transport elements for the containers, the transport elements being conveyed in a closed circuit. This, however, does not exclude a situation where at least sub-sections of the transport device do not form a closed circuit.

The positions of the plurality of transport elements shall here and in the following be regarded with respect to the transport path on which the transport elements are arranged. Here, the distance of a first transport element from a second transport element is defined as the distance of the two transport elements along the transport path, e.g. along a guide rail of the transport path. In particular, the distance of the first transport element from the second transport element may stand for the length of the shortest connection, with respect to potential branches of the transport path and/or closed parts of the transport path, along the transport path. According to the invention the transport elements for transporting the containers are guided in an individually controllable manner along the transport path. Specifically, this individually controllable and mutually independent movement of the transport elements can be performed by interaction of the transport elements with the transport path (see further below).

According to the invention the plurality of individually controllable transport elements comprises at least two transport elements used for respectively transporting one or plural containers, which are movably arranged on the transport path. Specifically, the plurality of transport elements may comprise a plurality of equally designed transport elements which can be moved individually and independently of one another along the transport path. This, however, does not rule out that individual transport elements differ from one another in one or several features. Specifically, the plurality of transport elements may comprise at least two groups of respectively equally designed transport elements that differ from one another by at least one feature, e.g. a functional element such as a gripping element and/or a configuration of the reaction element described further below. The number of transport elements on the transport path is here in principle arbitrary and is just limited by the length of the transport path as long as only at least two transport elements are present. For the reception of the at least one container at a receiving point and for the discharge of the containers at a discharge point the transport elements may be equipped with a suitable holding device, e.g. in the form of a gripping element. The gripping element may here be configured to be passively or actively controllable. Specifically, gripping elements are conceivable for the form-fitting or force-fitting gripping of a neck portion of the containers, e.g. in the so-called neck handling of plastic bottles, wherein the held container in the case of a form-fitting gripping is rotatably supported about its longitudinal axis in the gripping element. Moreover, the gripping element may be configured to be pivotable and/or height-adjustable.

Containers within the meaning of the present invention are particularly beverage bottles, but also other containers for foodstuff, drugs, hygiene articles, cleaning agents, or the like, such as for instance cans, glass bottles, or other glass containers with lid, packages based on cardboard or composite materials, tetra packs, or the like. This also comprises intermediate products, specifically preforms for stretch blow molding the containers, in the case of containers consisting of plastics. Furthermore, containers within the meaning of the invention also include arranged packs or units including a plurality of containers.

The transport elements may be designed as runners, pucks, slides, shuttles, or the like, which are moved by interaction with the transport path. According to the respective requirements each transport element may here be accelerated, decelerated, moved at a constant speed or even temporarily stopped altogether on the transport path. A variable displacement-time profile of each individual transport element can be implemented by individual control of the transport elements. Such an individual displacement-time profile is here and in the following designated as a motion profile of the respective transport element. The motion profile may here comprise a position of the transport element along the transport path in response to time and also the speed of the transport element in response to time. For each transport element of the plurality of transport elements, a separate, individual motion profile can particularly be stored in the open- and/or closed-loop control unit of the container treatment system, for instance in a storage unit.

For an individual distinction, at least one transport element of the plurality of transport elements may comprise a definite identification unit, e.g. in the form of a bar code, a readable memory chip, a printed, glued and/or engraved alphanumeric code, etc., which with the help of one or plural suitable identification detection devices along the transport path allows an identification of the transport element passing through the corresponding identification detection device. The identification unit of the transport element can particularly be used for the selective conduction of the transport element according to a predetermined motion profile, e.g. to a specific discharge point or to a specific container treatment unit.

Apart from data for the control of interaction elements of the transport path and/or reaction elements of the transport elements (see below), a predetermined motion profile may also comprise control parameters for switching switch points of the transport path. In response to the predetermined motion profiles the open- and/or closed-loop control unit controls and/or regulates the interaction elements of the transport path and/or reaction elements of the transport elements and/or switch points of the transport path in such a manner that the respective transport element moves in conformity with the respective predetermined motion profile along the transport path.

The motion profiles of the transport elements can here be predetermined automatically in response to a container and/or a product to be treated and/or in response to operational states of the container treatment units, particularly in response to a throughput of containers per time unit. For the start of the treatment system an initialization may be carried out that for instance determines the positions of the transport elements. Moreover, the motion profiles can be adapted by the operator to the desired production targets/conditions.

The form of the transport path is in principle arbitrary. Specifically, the transport path may substantially be closed, wherein substantially closed means that the transport path allows at least a closed route for the transport elements. In one embodiment, this can be implemented by providing a return section as part of the transport path, the return section allowing a return of the transport elements from a discharge point to a receiving point. The transport path, however, may also be designed to be at least partly open in such a manner that at least a section of the transport path is designed as a dead end for the transport elements, wherein the transport elements can be returned by reversal of the direction of movement. Specifically, such a dead end terminates at one of the discharge points.

To guide the transport elements during movement of the transport elements along the transport path, the transport path may comprise a guide rail and/or a guide channel. Thus the transport elements may comprise a complementary guide channel, a complementary guide element, e.g. a guide pin, and/or one or more suitably arranged guide rolls which are running e.g. by means of a flange on the guide rail of the transport path. A plurality of alternative embodiments, e.g. by means of slide bearings, are here conceivable. The provision of a guide rail on the transport path allows a low-friction sliding of the transport elements along the transport path. Moreover, the transport path may have a running surface on which corresponding support elements, such as support rolls, can roll or slide.

According to the invention the method for automatically adapting motion profiles of the plurality of transport elements comprises determining a treatment state of at least one container carried along by a first transport element and/or determining an operational state of at least one first container treatment unit which is arranged downstream with respect to a position of the first transport element along the transport path.

Treatment state of a container means here and in the following particularly the state of the container with respect to the process steps which are carried out or are still to be carried out on the container. Specifically, the treatment state can indicate whether a specific process step, such as the filling or labeling of the container, was carried out without any errors or in a complete manner, so that the container can be treated in further process steps. Likewise, the treatment state may designate a defective and/or damaged container. A damaged container may here also exist independently of the process steps that have already been carried out, e.g. as a burst bottle, and may also be caused by the transportation of the containers itself.

The determination of the treatment state of a container carried along by a transport element may here preferably be carried out before the treatment by a treatment unit, particularly by means of an inspection unit arranged upstream of the treatment unit. Such an inspection unit may e.g. be designed in the form of a light barrier, for instance for checking a fill level of a container. Likewise, the inspection unit may comprise a measuring device for determining the weight of an entrained container, whereby both fill level and gross damage can be detected. Furthermore, an optical control unit is conceivable, for instance as an optical scanner or camera with downstream image processing, so as to detect for instance damage to the container or applied labels or errors in printed print images. A plurality of further inspection units are known in the prior art. Such inspection units are for instance pyrometers, thermo cameras, metal detectors, color sensors, impurity inspectors, sniffers, or also inspectors for fill-level, closure or tightness control. The treatment state of the entrained container can be determined while the transport element is passing by the inspection unit, and can moreover be transmitted via cable connection or in a wireless manner as an encoded signal to the open- and/or closed-loop control unit. Specifically, each container that is supplied to the treatment unit for treatment in the infeed can thus be tested before reaching the treatment unit in such a manner that the process step to be carried out can be carried out in the treatment unit with success. Specifically, defective containers can be recognized in good time and treated accordingly (see below).

An operational state of a container treatment unit means here and in the following the capacity of the treatment unit for carrying out a specific process step on the containers. A treatment state may here encompass complete failure of the treatment unit, e.g. due to malfunction or missing supply materials, such as printing ink or labels, and also a restricted throughput of containers per time unit. For the automatic determination of the operational state of the treatment unit the treatment unit may comprise a suitable test device which may depend on the process step to be respectively carried out. Moreover, the treatment unit may comprise a signal device which transmits the determined operational state to the open- and/or closed-loop control unit via cable connection or wirelessly. The operational state of the treatment unit can here be determined continuously or at predetermined time intervals periodically.

In case of failure or a reduced throughput of a container treatment unit, the open- and/or closed-loop control unit can thus automatically adapt a motion profile of a transport element positioned upstream of the treatment unit, in such a manner that no or less transport elements are supplied to the treatment unit per time unit. This can prevent clogging of the treatment unit and/or further damage to containers and/or to the treatment unit. In case of failure the treatment unit can be removed, separated from the rest of the container treatment system, and can subsequently be serviced by the operating personnel. The adaptation of the motion profile of the transport element may comprise an adaptation of the speed of the transport element and/or of the route of the transport element, e.g. by switching corresponding switch points. Depending on the requirements, the motion profiles of several or all transport elements in the infeed to the treatment unit and, in case of prolonged failure of the treatment unit, also the remaining transport elements can be adapted to the changed treatment situation. Moreover, by buffering transport elements with treated containers downstream of the treatment unit, a temporary failure of the treatment unit can be compensated temporarily.

According to the invention the first transport element is moved by means of the open- and/or closed-loop control unit as part of a stream of transport elements. In other words, the plurality of transport elements which are moved by means of the open- and/or closed-loop control unit according to predetermined motion profiles along the transport path form a stream of transport elements which carry along containers for treatment by one or plural container treatment units arranged along a process section of the transport path. Such a stream of transport elements can e.g. connect a first container treatment unit, which carries out a first process step on the transported containers, to a second container treatment unit, which carries out a further subsequent process step on the containers. Likewise, such a stream can connect one of the above-described feed conveyors to a container treatment unit, and/or connect a container treatment unit to one of the above-described removal conveyors. The motion profiles of individual or of all transport elements can here be adapted automatically in response to a treatment state of the containers carried along and/or to an operational state of the container treatment units, so that individual transport elements can be deflected, buffered or ejected, or whole parts of the stream can be deflected.

According to the invention the plurality of the individually controllable transport elements is guided by means of an open- and/or closed-loop control unit, e.g. in the form of a process computer, along the transport path. The open- and/or closed-loop control unit may here be part of the open- and/or closed-loop control unit of the container treatment system or may be designed as a separate open- and/or closed-loop control unit of the transport device. Furthermore, the open- and/or closed-loop control unit may be implemented by a central open- and/or closed-loop control unit and/or by open- and/or closed-loop control units that are locally arranged on the transport elements. The one or plural open- and/or closed-loop control units may here be configured such that they individually control and/or regulate the electrical windings of the transport path and/or of the transport elements and also the position of one or plural switch points along the transport path. As has been described above, the electromagnets of the transport path and/or of the transport elements may particularly be controlled and/or regulated in response to the specific positions of the transport elements. Moreover, the current intensity can be regulated by the corresponding electrical windings in response to the force required, i.e. in response to a load state of a transport element and/or a desired acceleration/deceleration or speed, respectively, i.e. in response to a desired motion profile of the transport element. Furthermore, the one or plural open- and/or closed-loop control units may be configured as programmable logic controller(s) PLC.

According to a development the movement of the plurality of transport elements may take place at least in part through magnetic interaction of the respective transport elements with the transport path. According to the invention the transport path and the transport elements are configured such that each transport element can be guided in an individually controllable manner from a receiving point to a discharge point. This means that the transport elements respectively comprise at least one reaction element which by means of mechanical and/or electromagnetic interaction with interaction elements arranged along the transport path is subjected to a force by which the respective transport element can be accelerated and thus moved. By way of a targeted control of the reaction element of a specific transport element and/or one or plural interaction elements within a defined area of the transport path, this force can be exerted on and restricted to a specific transport element, whereby the transport element can be guided individually and independently of other transport elements along the transport path. Hence, the inventive movement at least of the first transport element can be carried out by way of a targeted control of the respective reaction element and/or of the respective interaction elements in the corresponding area of the transport path. The individual control of the transport elements or the control of the reaction elements and/or the interaction elements is carried out by means of the open- and/or closed-loop control device of the container treatment system.

To this end particularly a part of the transport path may be equipped with a magnetic linear drive, e.g. in the form of an asynchronous linear motor. To this end the corresponding section of the transport path may be equipped with a plurality of electrical windings in the form of individually controllable electromagnets. To produce a magnetic interaction between a transport element and the individually controllable electromagnets of the transport path, the transport element may be equipped with one or plural permanent magnets or with non-switching electromagnets or iron cores. In a possible configuration the transport element may be configured as a passive transport element which is moved by interaction with the electromagnetic alternating fields produced by the individually controllable electromagnets of the transport path. The at least one permanent magnet or non-switching electromagnet or iron core of the transport element thereby forms the above-mentioned reaction element whereas the individually controllable electromagnets of the transport path form the above-mentioned interaction elements. Preferably, when passive transport elements are used, a localizing unit is mounted on the transport path to determine the position of at least one transport element and preferably of all transport elements and to communicate this position to an open- and/or closed-loop control unit for the control of the electromagnets of the transport path. The current intensity through the electrical windings of the transport path can be automatically adapted by the open- and/or closed-loop control unit in response to the force required by the transport element to be moved. The transport element can be accelerated, decelerated or moved at a constant predetermined speed by individual control and/or regulation of the current intensity through individual windings of the transport path. Specifically, a motion profile of the first transport element which is predetermined in the open- and/or closed-loop control unit of the container treatment system can be implemented by individual regulation of the current intensity through individual windings.

In an alternative embodiment, the transport element as an active transport element is provided with electrical windings which can apply the alternating magnetic fields required for driving. The section of the transport path is correspondingly provided with permanent magnets or non-switching electromagnets. Both the electrical energy needed for the drive and the signals needed for the control can here be transmitted via induction transmission to the transport elements. Hence, the controller may be locally provided on the respective transport elements or also centrally in a separate control unit. Alternatively, the necessary electrical energy can be transmitted via a line arranged along the transport path to the transport elements. Furthermore, a combination of the design of the transport elements as active transport elements with a transport path with individually controllable electromagnets is conceivable.

Apart from the above-described part of the transport path which is configured as a magnet route, the transport path may further comprise at least one sub-section along which the transport element can be moved at a constant speed. To this end the sub-section may comprise a drive device in the form of a conveyor belt, a conveyor chain, or the like. By combination of sub-sections with magnetic drive and sub-sections with a mechanical drive the installation costs of the total transport device can be lowered.

According to a further development the position of the first transport element can be determined by means of a plurality of sensors, particularly magnetic field sensors, which are arranged along the transport path. Specifically, by way of a regular and periodic arrangement of sensors along at least a part of the transport path, the position of a transport element on said part of the transport path can be determined. The sensor may be designed as an optical sensor, electrical sensor, electromagnetic sensor, or mechanical sensor, with the position of the transport element being determined in the area of the sensor e.g. by measuring a light reflection on a reflector element of the transport element, by induction of an electromagnetic signal based on the movement of the transport element, by changing the electrical resistance of the sensor by exploiting a magnetoresistive effect, e.g. based on the magnetic flux of a magnetic reference element, particularly a permanent magnet, or of the reaction element of the transport element, or by local pressure measurement based on the weight of the transport element. An electromagnetic sensor may here be designed as a Hall sensor, which will even supply a signal when the magnetic field in which it is positioned is constant. Likewise, a change in the electrical resistance which depends on the magnetic field to be measured is achieved in the design of an electromagnetic sensor as a magnetic field sensor based on magnetoresistive effects, such as the anisotropic magnetoresistive effect (AMR effect), the "giant" magnetoresistive effect (GMR effect), and further magnetoresistive effects, such as the CMR effect and the TMR effect. Both Hall sensors and magnetoresistive sensors thereby make it possible to determine the position of a transport element along the transport path also without any inductive effects, i.e. also at a standstill of the transport element. The corresponding sensor detects a local change in the background magnetic field by the reaction element, particularly by a permanent magnet or electromagnet mounted thereon, of the transport element. Alternatively or in addition, the transport element may comprise a signal unit which produces a position signal. The position signal can then be localized by suitable detectors in the area of the transport device to determine the position of the transport element along the transport path. The signal unit of the transport element may particularly be designed as an RFID chip.

According to a development the operational state of the first container treatment unit may comprise comparing the determined operational state with a predetermined desired operational state, wherein the motion profile of the first transport element is adapted when the determined operational state deviates from the predetermined desired operational state, in such a manner that the first transport element bypasses the first container treatment unit along a bypass section of the transport path.

The desired operational state of the first container treatment unit can be predetermined by means of the open- and/or closed-loop control unit automatically or manually by the operating personnel in response to the container or product to be treated and to the process step to be carried out and may particularly comprise a desired throughput of containers per time unit. If by comparing the determined operational state with the desired operational state a deviation beyond given tolerance limits is detected, the motion profile of the first transport element can be adapted automatically such that the first transport element bypasses the first container treatment system along a bypass section of the transport path instead of passing through the first container treatment system. To this end the bypass section may be connected upstream of the first container treatment system to the transport path via a controllable switch point which can be switched by the open- and/or closed-loop control unit according to the modified motion profile of the first transport element. The first transport element can thereby be ejected out of the infeed to the first treatment unit onto the bypass section.

Subsequently, the first transport element can be reintroduced into the process section of the transport path downstream of the first container treatment unit for carrying out further process steps which are particularly independent of the process step of the first container treatment unit. To this end the bypass section can be connected downstream of the first treatment unit by means of a controllable switch point to the process section of the transport path. Hence, the first transport element can be guided past the first treatment unit by switching the respective switch point, said switching being controlled according to the modified motion profile, and by controlling the interaction elements of the bypass section. The first transport element thereby bypasses the first treatment unit according to its modified motion profile. With a reduced throughput of the first treatment unit, individual ones of the plurality of transport elements can be guided past the first treatment unit by adapting the respective motion profiles so as to avoid accumulation in front of the first treatment unit. In case of a complete failure of the first treatment unit, particularly all transport elements positioned in the infeed to the first treatment unit can be guided past the first treatment unit until said unit has been repaired.

Hence, the motion profile at least of the first transport element can be adapted such that the first transport element after bypassing the first container treatment unit is supplied to a second container treatment unit arranged along the transport path downstream of the first container treatment unit. The bypass section, however, may also comprise detours for more than the first container treatment unit. Specifically, the bypass section may comprise a separate detour for each container treatment unit of the container treatment system, as well as a part which extends in parallel with the process section and permits the bypassing of more than one treatment unit.

According to a development the motion profile of the first transport element can further be adapted such that the first transport element is buffered at least temporarily along the bypass section. The motion profile can here be adapted such that the first transport element is ejected onto the bypass section and is there stopped at a predetermined position, for instance on a separate buffer section of the bypass section. Hence, one or plural transport elements can be stored, i.e. buffered, at least temporarily on the bypass section. The buffered transport elements can subsequently be supplied either to a downstream second container treatment unit or, after repair or increase in the throughput of the first container treatment unit, returned to an infeed of the first container treatment unit.

According to a further development the method may include renewed determination of an operational state of the first container treatment unit and comparison of the operational state determined anew with the predetermined desired operational state and the return of the first transport element to an infeed of the first container treatment unit if the newly determined operational state corresponds to the predetermined desired operational state. Specifically, the operational state of the first container treatment unit can be determined anew at predetermined regular time intervals. If the treatment unit has been repaired or if its throughput has been raised to the desired throughput, the first transport element can be returned according to the present development to an infeed of the treatment unit to make up for the missing process step. The returning action can here be carried out directly out of the bypass section, e.g. if the first transport element has been buffered there. Alternatively, the returning operation can also be carried out by ejecting the first transport element downstream of a second or of further container treatment units via the bypass section after further process steps have already been carried out on the entrained container of the first transport element. The bypass section can thus be operated in both directions; here, in case of a reverse mode operation, i.e. when the first transport element is returned, the transport element(s) to be returned can preferably be supplied again at any desired points of the process section. Hence, it is possible to simultaneously transport containers usually treated in opposite direction along the process section without any collision. Moreover, the sequence of the process steps can also be adapted flexibly by means of the bypass section and by adapting the motion profiles without the need for a reconstruction of the container treatment system.

According to a development, determining the treatment state of the container carried along by the first transport element may comprise comparing the determined treatment state with a predetermined desired treatment state, wherein the motion profile of the first transport element in case of a deviation of the determined treatment state from the predetermined desired treatment state is adapted such that a distance of the first transport element from a second transport element directly preceding the first transport element in the stream is reduced to a predetermined distance. The desired treatment state can be predetermined automatically or manually by the operating personnel in response to the container or product to be treated and particularly in response to a desired result of a process step carried out last. A desired treatment state may for instance indicate a fill level for a product to be filled into the container. Any deviation from the desired treatment state—particularly within given tolerances—can be checked by way of comparison with the determined treatment state of the container. Defective or insufficiently treated containers can thereby be identified.

For instance, an inspection unit can check the treatment state of the containers transported by the transport elements at a predetermined point of the transport path, i.e. at a checkpoint, upstream of the first container treatment unit and thus recognize and/or mark containers with a treatment state not conforming to the predetermined quality standards, i.e. the predetermined desired treatment state, as defective. Such a marking can inter alia be carried out mechanically by switching a switching element mounted on the corresponding transport element or electronically by writing a suitable marker signal into a storage unit of the transport element. Defective containers may e.g. be damaged containers, incorrectly labeled containers, incompletely filled containers, contaminated containers, or the like. Since defective containers represent rejects, they are in general not treated in further process steps. This can inter alia save material and energy.

A transport element which transports a container recognized as defective, i.e. for which the determined treatment state of the container deviates from the predetermined desired treatment state, can be unloaded on a specifically provided removal conveyor along the transport path to remove said defective container (see below). If this container is the only container transported by the transport element, the unloaded transport element may be moved onwards as part of the product stream with said stream. As an alternative, the transport element with the defective container may be ejected out of the stream of transport elements before or after the unloading of the defective container, e.g. by controlling a switch point of the transport path and correspondingly adapting the respective motion profile (see below). The removal conveyor and the switch point, respectively, may particularly be positioned upstream of the first container treatment unit and downstream of the above-mentioned inspection unit.

In both cases a gap is formed in the stream of the transport elements transporting flawless containers, said gap possibly leading, as has been described above, to delays in the production process in subsequent container treatment units. Hence, the situation arises that at least the first transport element that transports at least one container detected to be defective is positioned along a part of the transport path between a second and third transport element which are each transporting one or more flawless containers. At the end of the sub-section the first transport element is then either unloaded from the defective container and/or is ejected out of the stream. This, however, results in a gap in the form of an increased distance between two neighboring transport elements with flawless containers, i.e. between the second and the third transport element. The inventive method according to the present development therefore comprises a closing of said gap in the product stream by adapting the motion profile at least of the first transport element such that a distance of the first transport element from a second transport element directly preceding the first transport element in the stream is reduced to a predetermined distance. Directly preceding means here and in the following that no further transport element is positioned along the transport path between the first and the second transport element.

The distance of the first transport element from the second transport element is here and in the following understood as the length of the shortest connection between the two transport elements along the transport path. On the basis of the motion profiles of the first and second transport element that are stored in the open- and/or closed-loop control unit, the distance of the two transport elements can be calculated by means of a process unit of the open- and/or closed-loop control unit at any time. Alternatively or in addition, the distance can be determined by determining the positions of the two transport elements by means of the above-described sensors, by transmitting the determined positions to the open- and/or closed-loop control unit and by calculating the distance from the determined positions.

The motion profile of the first transport element can then be adapted such that the distance of the first transport element from the second transport element is reduced to a predetermined distance. The predetermined distance can here be predetermined by an operator of the container treatment system and/or an open- and or closed-loop control device of the container treatment system, particularly in response to a processing rate of a container treatment unit and/or a delivery rate of a feed conveyor or a removal conveyor, respectively (see below).

To reduce the distance between the first transport element and the second transport element, the motion profile of the second transport element may also be adapted in addition to the motion profile of the first transport element. The adaptation of the motion profiles of the first and/or the second transport element may particularly comprise an individual acceleration or deceleration of the first and/or the second transport element along a part of the transport path. In the event that the first and/or the second transport element is in the movement state already at the beginning of the adaptation process, the distance of the first transport element from the second transport element can be adjusted to the predetermined distance, particularly without reversal of the movement direction of the first and/or the second transport element. Since the first and/or the second transport element as part of a stream of transport elements are in general moved along the transport path in a predetermined direction, the transport element of the two transport elements that is succeeding with respect to this direction, i.e. the first transport element, can be accelerated with respect to the movement speed of the preceding transport element, i.e. the second transport element, to achieve a decrease in the distance by adapting the motion profiles. By accelerating the succeeding transport element, it is possible to prevent a reduction of the flow of transport elements in the stream. By analogy, the succeeding transport element can advantageously be decelerated to increase the distance. The method according to the invention is however not restricted to the above-described examples, but may also comprise a reduction of the distance by acceleration of the succeeding transport element and by simultaneous deceleration of the preceding transport element.

In a further development, the predetermined distance may correspond to half a predetermined division of the stream of transport elements along at least a part of the transport path. The division of a stream or product stream designates here and in the following a distance that is constant along a part of the transport path and exists between two neighboring transport elements transporting flawless containers, said distance being determined by the open- and/or closed-loop control unit in response to a throughput or a treatment rate of a container treatment unit following the part of the transport path and in response to a speed of the transport elements along the part of the transport path. Since a container treatment unit generally requires a fixed treatment time for carrying out a container treatment, the supply of untreated containers is required at regular time intervals as part of a regular product stream. Hence, a necessary constant distance of the transport elements in the stream along the part of the transport path and thus a predetermined division of the stream follows from these regular time intervals and from a speed of the transport elements that is in general constant in time and/or space along the part of the transport path before the container treatment unit.

To maintain a predetermined division, and in addition to the adaptation of the motion profile of the first transport element, which contains an entrained container which has been recognized to be defective, the motion profile of a third transport element directly following the first transport element in the stream can be adapted by the open- and/or closed-loop control unit such that the distance of the third transport element from the preceding second transport element corresponds to the predetermined division. In other words, the motion profiles of the first and third transport element—in the event that the determined treatment state of the container carried along by the first transport element deviates from the predetermined desired treatment state—can be adapted such that both the first and the third transport element move up to the preceding second transport element. The gap formed because of the defective container is thereby closed. Likewise, the motion profiles of further succeeding transport elements can also be adapted such that no new gaps occur, i.e. deviations from the predetermined division of the stream. Specifically, additional transport elements may be buffered in the infeed to the first container treatment unit so as to compensate a possible gap. This means that in the infeed to the first container treatment unit more transport elements can be kept than are needed because of the predetermined division as long as the division of the stream is achieved at least directly before the first container treatment unit.

By adapting the distance of the second and third transport element between which the first transport element with the defective container or the first transport element that is unloaded from the defective container is positioned after reduction of its distance from the second transport element, it can thus be ensured in the infeed to the first container treatment unit that the transport elements with flawless containers, i.e. the second and the third transport element, reach the first container treatment unit with the predetermined division. The division of a stream of transport elements generally depends on the respective process section, particularly on the respective container treatment unit, and can be adapted at short notice with the help of the described method also in response to the containers to be treated by adapting the motion profiles of the transport elements by means of the open- and/or closed-loop control unit. This permits a rapid switching of the container treatment system to a different product.

In the event that the first transport element is not ejected, the first transport element can thus be passed on in the middle between the third and the second transport element. Hence, the method according to the invention may further comprise the reduction of the distance of the third transport element from the first transport element or the distance of the third transport element from the second transport element by adapting the motion profiles of the third and/or second transport element and/or of the first transport element. The first transport element that is positioned along the part of the transport path as part of the stream between the third and the second transport element is thus particularly a transport element with a defective container. Alternatively or in addition, the first transport element may however also be a transport element with a flawless container which for the purpose of dividing the stream of the transport elements and thus the product stream is ejected via a switch point at the end of said part of the transport path.

As has already been mentioned, the method further comprises the unloading of the first transport element from the entrained container in case of a deviation of the determined treatment state from the predetermined desired treatment state. The container can here be received by a removal conveyor arranged upstream of the first container treatment unit and can be recovered by recycling.

As an alternative to a continued co-movement of the first transport element in the stream, and according to a further development, adapting the motion profile of the first transport element in case of a deviation of the determined treatment state from the predetermined desired treatment state may comprise ejecting the first transport element out of the stream of transport elements. Thus a container detected to be defective can be ejected out of the product stream. For this purpose the transport path may be connected upstream of the first container treatment unit via a switchable switch point to a secondary section of the transport path for ejecting the first transport element. The adapted motion profile may thus also comprise the switching of the switch point for ejecting the first transport element. The secondary section may additionally comprise a removal conveyor for unloading the first transport element from the container carried along and, moreover, be connected to a return section of the transport path for returning unloaded transport elements at the beginning of the process section.

As has already been stated above, in this development the method may further comprise adapting a motion profile of a second transport element directly preceding the first transport element in the stream prior to the ejection of the first transport element, and/or a motion profile of a third transport element directly succeeding the first transport element in the stream prior to the ejection of the first transport element, in such a manner that a distance of the third transport element from the second transport element is reduced to a predetermined distance. The predetermined distance may here particularly correspond to a predetermined division of the stream of transport elements along at least a part of the transport path. This is here particularly understood as a predetermined division in the infeed to the first container treatment unit, which for instance in response to a print set and/or a desired operational state of the first container treatment unit can be predetermined by the operating personnel automatically or manually.

By reducing the distance of the third transport element from the second transport element after unloading and/or ejecting the first transport element, a constant distance of neighboring transport elements with flawless containers can be achieved in a subsequent part of the transport path. An otherwise required gap processing of the subsequent container treatment units can thereby be avoided, whereby a temporary reduction of the treatment rate due to gaps can be avoided. The transport elements following the third transport element can be accelerated by means of the open- and/or closed-loop control unit by adapting their motion profiles in such a manner that they join up the third transport element according to the predetermined distance. For the final compensation of the gap the treatment rate of a container treatment unit arranged upstream in the product stream can further be increased by means of the open- and/or closed-loop control unit temporarily, so that the resulting gap can be closed completely.

Since a container treatment unit arranged downstream in the product stream can be controlled such that it only treats the containers of transport elements at a predetermined time interval and/or spatial distance, it is possible by closing a gap, i.e. by the further transportation of a first transport element, which is loaded with a defective container or is unloaded, between the third and the second transport element, the distance of which has been adjusted to the predetermined distance, that the unloaded first transport element or the first transport element with the defective container is skipped in the container treatment unit. As a consequence, even an unloaded transport element or a transport element transporting a defective container can be further transported with the product stream until it can be ejected and/or unloaded at a corresponding point of the transport path.

According to a development the treatment state of the container carried along by the first transport element can be determined, as has been described above, in the infeed to the at least one container treatment unit, with the predetermined desired treatment state being predetermined in response to a position of the first transport element along the transport path. Since the predetermined desired treatment state normally depends on the process steps already taken, the predetermined desired treatment state can be predetermined in response to the position of the first transport element. Specifically, it may be useful to determine the treatment state, e.g. the successful performance of one or more process steps that have already been taken, prior to the performance of the next process step, i.e. in the infeed to the next container treatment unit. Specifically, a corresponding inspection unit for determining the respective treatment state may respectively be arranged in the infeed to one or plural container treatment units. It can thereby be ensured that only flawless containers are subjected to the treatment by the respective container treatment unit.

According to a development of one of the first three developments described, the method may further comprise: determining a treatment state of at least one container carried along by a second transport element among the plurality of transport elements, adapting the motion profile of the first transport element and/or the motion profile of the second transport element in response to the determined treatment states of the entrained containers of the first and second transport element in such a manner that a distance of the second transport element from the first transport element is reduced to a predetermined distance, wherein the first and the second transport element are directly adjacent along the transport path, and wherein the first transport element is coupled to the second transport element when the predetermined distance is reached.

Directly adjacent means here and in the following that no further transport element is positioned along the transport path between the first and the second transport element. Hence, the first and the second transport element can in theory be approximated to a minimum distance which is given by the form of the first and the second transport element. According to the invention the adaptation of the motion profiles of the first and/or second transport element in this development comprises a reduction of the distance of the first and the second transport element, wherein the first transport element is coupled to the second transport element when the predetermined distance is reached. Hence, when the predetermined distance is reached, the first transport element together with the second transport element forms a so-called train which after completion of the coupling operation is jointly moved with a joint motion profile by means of the open- and/or closed-loop control unit along a part of the transport path. The relative distances between the individual transport elements of the train remain here constant by reason of the coupling also without a separate control and/or regulation.

The formation of a train of transport elements may be desirable and of advantage for various reasons during process control in a container treatment system. On the one hand, the distance between neighboring transport elements can be minimized by the formation of a train, so that a processing rate of a container treatment unit can be maximized. On the other hand, the reaction elements of directly neighboring transport elements particularly during movement of the transport elements by magnetic interaction with the transport path are in general arranged such that they repel each other, so that a movement of the transport elements with minimum distance, i.e. traveling without gap, requires the additional application of a force by way of magnetic interaction and thus additional energy. By coupling the first and second transport element to form a train, this additional application of force or energy is not required. On the contrary, transport elements coupled to form a train can be moved even more efficiently as they have a greater number of reaction elements. Hence, a correspondingly greater force can be exerted by way of interaction with the transport path onto the transport elements which are connected to form a train. Moreover, due to the process an accumulation or buffering of transport elements may be desired in a specific part of the transport path, for instance, in order to avoid emptying of a container treatment unit. For this purpose the transport elements which are connected to form a train can be guided jointly along the infeed to such a container treatment unit to be decoupled again prior to treatment by the container treatment unit.

According to this development the formation of a train consisting of at least the first and the second transport element is preceded by the determination of the treatment states of the containers of the first and the second transport element. Specifically, the formation of a train is in general only desired if the formed train carries along containers with identical or similar treatment states. For instance prior to the formation of the train it can be checked whether the determined treatment states correspond to a predetermined desired treatment state. For instance, containers which are printed on by way of direct printing and belong to two or more transport elements can be carried along for the joint curing of the print image in an UV curing station by a formed train at a minimum distance of the transport elements forming the train after an inspection unit has checked that the respective print images comply with the given requirements. It goes without saying that a train may also be formed by more than two transport elements. As has been described above, the distance between first and second transport element can be reduced by accelerating the succeeding, e.g. the first, transport element, and/or by delaying the preceding, e.g. the second, transport element by the respective motion profiles thereof being automatically adapted by means of the open- and/or closed-loop control unit.

The predetermined distance at which the first transport element is coupled to the second transport element when said distance has been reached is in general different from the above-described, predetermined division of the product stream. Specifically, the predetermined distance used for coupling is in general smaller than the above-described predetermined division. The predetermined distance can be predetermined in response to the shape and expansion of the transport elements and/or the containers to be treated and may be stored in a storage unit of the open- and/or closed-loop control unit.

In a further development the distance is reduced at least in part against a magnetic repulsive interaction between the first and the second transport element. This may particularly be the case when, as described above, the first and second transport elements are moved at least in part by magnetic interaction with the transport path and, for this purpose, comprise reaction elements with electromagnets and/or permanent magnets that are arranged such that a magnetic repulsive interaction is achieved between the reaction elements of neighboring transport elements. This can e.g. be implemented in that the magnetic poles at the front and rear sides, viewed in the direction of movement, of the transport elements are the same. Specifically, this can be achieved by way of a mirror-symmetrical arrangement of the magnets of the reaction elements with respect to a plane perpendicular to the direction of movement. Such an arrangement in which the reaction elements of neighboring transport elements magnetically repel each other serves inter alia the prevention of collisions, by which the transported containers might get damaged. Therefore, for moving two transport elements closer to one another against this magnetic repulsive interaction, a force is needed that can e.g. be produced by the magnetic interaction of the transport elements with the transport path. After the first transport element has been coupled to the second transport element, this force is applied by coupling the two transport elements, so that the predetermined distance achieved can be kept constant without any additional force application by the transport path.

According to a further development the coupling operation may be carried out mechanically and/or magnetically. A mechanical coupling can be implemented by mechanical coupling elements of the first transport element and the second transport element, respectively. Since mechanical coupling elements are well known in the prior art, hooks, eyes, pins and loops shall here just be mentioned as examples of possible implementations. A magnetic coupling can be implemented by means of one or plural magnets of the reaction elements which exclusively serve coupling purposes, and/or by the guiding magnets of the reaction elements themselves, i.e. by the magnets which by magnetic interaction with the transport path serve the movement of the transport element.

In case of magnetic coupling, the coupling operation can be carried out at least in part by reorientation or polarity reversal of one or plural magnets arranged on the first or second transport element. By reversing the polarity of an electromagnet of one of the two directly adjacent transport elements, the above-described magnetic repulsive interaction can be converted into an attractive interaction. When the polarity of an electromagnet, which is separately provided for coupling purposes, is reversed, the attraction between the electromagnet with the reversed polarity and the electromagnet with the non-reversed polarity of the neighboring transport element overcomes the mutual repulsion of the magnets serving the movement of the transport elements on the reaction elements of the neighboring transport elements. In this development of the method according to the invention, it is assumed that the respectively corresponding magnets of the neighboring transport elements are arranged prior to reorientation or polarity reversal such that they repel each other. The reorientation can be carried out by rotating a permanent magnet or electromagnet about an axis, particularly about an axis perpendicular to the dipole axis of the magnet. According to the invention only magnets of one of the two transport elements are reoriented or polarity-reversed for coupling two directly adjacent transport elements by way of magnetic coupling. This can e.g. be achieved in that the corresponding magnets of the first transport element are rotatably supported or are switchable whereas the corresponding magnets of the second transport element are firmly connected to the transport element or are non-switchable. The polarity reversal of one or plural magnets arranged on the first or second transport element can be carried out by means of a central control unit or a decentralized control unit mounted on the transport elements. Thus, the coupling elements which are reoriented, polarity-reversed or somehow moved mechanically represent active coupling elements which couple to complementary passive coupling elements of the transport element to be coupled, i.e. non-switching, stationary or fixed coupling elements.

In a further development the reorientation can be carried out by means of a cam which is switchable by the open- and/or closed-loop control unit of the container treatment system, or automatically by way of magnetic interaction between the first and the second transport element. The switchable cam may here be located at a predetermined place of the transport path and engaged or disengaged by means of a signal from the open- and/or closed-loop control unit. When a transport element with a rotatable magnet is moved by, the disengaged cam can grip into a bracket or a similar mechanical device of the transport element which is rotated by the movement of the transport element relative to the cam and thereby reorients the rotatable magnet. As an alternative, the switchable cam may also be arranged on a rotatably supported disk which carries the magnet to be reoriented and, after disengagement, may grip into a complementary bracket along the transport path so as to be subjected to a torque with respect to the rotational axis of the magnet to be reoriented. The use of a switchable cam allows a fast reaction time because cam switching can also be carried out at a high power or high speed of the transport element along the transport path. The rotation of the rotatably supported magnet can further be carried out against a particularly preloaded resetting device of the transport element, by which the original orientation of the rotatable magnet is reestablished after decoupling. The rotatable magnet can here be fixed by means of one or plural locking devices before and/or after reorientation. The one or plural locking devices, just like the switchable cam, can here be switched by means of an open- and/or closed-loop control unit.

In an advantageous development the reorientation of the one or the plural, rotatably supported magnets can be carried out automatically by way of magnetic interaction between the first and the second transport element. When two repelling magnets approach each other, both magnets are subjected to an increasingly repelling force which tries to move apart the repellent poles of the magnets. If one of the magnets is rotatably supported, this repelling force yields a torque which tries to orient the rotatable magnet such that both magnets show maximum attraction. Hence, in the event that at least one of the two magnets is rotatably supported, a reorientation and thus switching from repulsive interaction to attractive interaction can take place automatically by way of magnetic interaction between the two magnets.

According to a development the first and the second transport element can be moved with a joint motion profile jointly along a part of the transport path after the coupling operation. Specifically, as has been described above, the first and the second transport element form a so-called train which can be moved by individual control of the interaction elements of the transport path as a unit along the transport path. Such a train can here form a product stream with minimum division. The control of the interaction elements arranged along the transport path can be adapted, after coupling of the first and second transport element, automatically by the open- and/or closed-loop control unit to the arrangement of the reaction elements of the train formed thereby in that, instead of the individual motion profiles of the transport elements forming the train, a joint motion profile of the train is stored in a storage unit of the open- and/or closed-loop control unit. The formed train can thereby be moved more efficiently and/or with a greater force than is possible with an individual movement of separate transport elements.

The above-mentioned object is also achieved by a transport element for transporting at least one container along a transport path, said element comprising:

at least one support element which is configured such that the transport element can be movably supported on the transport path, a holding device for holding one or plural containers, a reaction element which comprises at least one permanent magnet and/or at least one electromagnet, wherein the reaction element is configured such that the transport element can be moved by magnetic interaction with the transport path along the transport path, and a first coupling element which is configured such that the transport element can be coupled by means of the first coupling element to a first further transport element.

The same variations and embodiments which have been described above in connection with the method according to the invention for the said elements of the transport element can also be used in the transport element according to the invention. Specifically, the transport element can be movably supported on the transport path owing to the at least one support element. The transport element can here be supported fully magnetically or partly magnetically and partly mechanically or fully mechanically on the transport path. In the case of a fully magnetic support, at least a part of the transport path is designed as a magnetic levitation train, wherein electrical windings are provided in the transport path and/or the transport element, said windings causing magnetic levitation of the transport element above the transport path. Specifically, at least one permanent magnet and/or at least one electromagnet of the reaction element can serve the magnetic levitation of the transport element. Owing to the fully magnetic support, the friction between the transport element and the transport path can be reduced to a minimum. In the case of a partly magnetic and partly mechanical support, the transport element may additionally comprise one or more support elements, for instance in the form of support rolls and/or guide rolls. The additional support elements roll or slide on a running surface of the transport path. In the case of a fully mechanical support, the transport element may exclusively be supported by the at least one support element described. In addition or as an alternative, a pneumatic support is also possible, with the transport path in the corresponding piece being designed as an air suspension path. In the case of a pneumatic support, like in the case of a fully magnetic support, one achieves a minimal friction between the transport element and the transport path.

The holding device for holding one or plural containers may e.g. be designed as a gripping element, as has been described above. As described above, the reaction element of the transport element may comprise at least one permanent magnet and/or at least one electromagnet. As described above, an accelerated, decelerated or constant movement of the transport element along the transport path can be achieved by individual control of electrical windings of the transport path and/or the at least one electromagnet of the reaction element. Depending on the type, the magnet(s) of the reaction element which via magnetic interaction with the transport path serve the controlled movement of the transport element can also make at least a partial contribution to a magnetic support of the transport element on the transport path.

The first coupling element may be configured such that the transport element can be coupled by means of the first coupling element to a complementary coupling element of a further transport element. For instance, the first coupling element may be designed as a so-called active element which is switched, i.e. moved or activated, during coupling, whereas the complementary coupling element of the further transport element may be designed as a passive coupling element which does not have to be moved or activated during coupling. Alternatively, the first coupling element may be designed as a passive coupling element which can be coupled to an active coupling element of the further transport element. Active coupling elements, such as hooks, loops or the like, and passive coupling elements, such as eyes, pins or the like, are known in the prior art and are therefore not further specified herein.

According to a development the transport element may further comprise a second coupling element which is configured such that the transport element can be coupled by means of the second coupling element to a second further transport element. The second coupling element may here be designed as an active or passive coupling element. With the help of the first and the second coupling element the transport element can thus be coupled at both sides to a respective further transport element, so that a so-called train of three transport elements can be formed. By arrangement of a respective first and second coupling element as complementary coupling elements on the transport elements and by corresponding orientation of the transport elements along the transport path, it is possible to form trains of any desired number of transport elements.

According to a further development the first and/or second coupling element may comprise a switchable mechanical coupling element. The switchable mechanical coupling element can e.g. be switched by a central open- and/or closed-loop control unit to couple the transport element to a further transport element. The open- and/or closed-loop control unit which switches the mechanical coupling element may however also be arranged on the transport element. The switchable mechanical coupling element can however also be switched by means of a switchable cam by relative movement of the transport element relative to the transport path, as has been described above. Likewise, an existing coupling of two transport elements can be uncoupled by switching the switchable mechanical coupling element.

According to a development the first and/or second coupling element comprises a permanent magnet and/or an electromagnet, wherein the permanent magnet is rotatably supported on the transport element, and wherein the polarity of the electromagnet can be reversed by means of an electrical circuit of the transport element. As has already been described above, the permanent magnet can here be supported on the transport element to be rotatable about an axis which is perpendicular to the movement direction of the transport element. The polarity of the electromagnet can be reversed by means of an electrical circuit of the transport element by an open- and/or closed-loop control unit of the transport device or the transport element. By reorientation of the permanent magnet by way of a rotation of the permanent magnet about the rotational axis or by polarity reversal of the electromagnet, a repulsive interaction between the reaction element of the transport element and the reaction element of a further, directly neighboring transport element can be converted into an attractive interaction, as has been described above. The two transport elements are thereby coupled through the magnetic attraction of the permanent magnets or electromagnets of their coupling elements to each other. A possibly further existing repulsive interaction of the reaction element is here overcompensated by the attraction of the coupling elements, resulting in a permanent coupling of the two transport elements. By renewed reorientation of the permanent magnet of the transport element or by polarity reversal of the electromagnets of the transport element said magnetic coupling can be offset again.

In a further development the permanent magnet and/or the electromagnet may be configured as a part of the reaction element. Hence, specifically the first and/or second coupling element may be configured as part of the reaction element. In a special development, particularly the permanent magnet and/or the electromagnet which serve magnetic coupling can also be used for magnetic interaction with or magnetic support on the transport path. As an alternative, separate magnets or magnet groups of the reaction element can serve magnetic coupling, magnetic interaction or magnetic support, respectively.

According to a further development the permanent magnet can be reoriented by means of a switchable cam. As has already been described before, this switchable cam may be arranged at a predetermined position along the transport path or on the transport element. A bracket gripping into the switchable cam may be arranged accordingly on the transport element or on the transport path, respectively. After switching the cam, e.g. by an open- and/or closed-loop control unit of the transport device, the permanent magnet is reoriented by movement of the transport element along the transport path, so that previously repelling magnets of the coupling elements of two neighboring transport elements now attract each other.

In an alternative development, the permanent magnet can be reoriented by means of magnetic interaction with the first further transport element. As has been described above, the increasing repulsive interaction when the transport element is approaching the first further transport element leads to a torque on the rotatably supported permanent magnet which reorients the permanent magnet upon further approach such that the magnetic attractive interaction between the permanent magnet and the complementary magnet of the first further transport element is maximized. Hence, a reorientation of the permanent magnet of the transport element and thus a magnetic coupling of the transport element to the first further transport element in the case of a freely rotatably support of the permanent magnet can already be carried out automatically by the transport element approaching the first further transport element.

According to a further development, the transport element may further comprise a spring-loaded locking device for locking the permanent magnet, which is configured such that it is automatically released when a first predetermined threshold value of the magnetic repulsive interaction with the first further transport element is exceeded. Such a spring-loaded locking device for locking the permanent magnet can for instance be implemented by a spring-loaded bolt which grips into a recess of a rotatable disk on which the permanent magnet is arranged. When the first predetermined threshold value of the magnetic repulsive interaction with the first further transport element is exceeded, the bolt-tensioning spring is here compressed to such an extent that the locking device is automatically released. After the locking device has been released, the rotary disk with the permanent magnet is then automatically reoriented by the magnetic interaction with the first further transport element. The first predetermined threshold value of the magnetic repulsive interaction can here be chosen such that it corresponds to the distance between two neighboring transport elements at which a magnetic coupling is to be carried out. By approximating two transport elements by way of an individual control of the transport elements, thus by adaptation of their respective motion profiles, to that distance, an automatic magnetic coupling of the two transport elements can thereby be carried out without any additional switching and/or control operations.

According to a further development, the transport element may further comprise a resetting device which is configured such that, when a second predetermined threshold value of the magnetic attractive interaction is fallen short of, it rotates the permanent magnet back into an original orientation. The resetting device may here be configured such that a reorientation of the permanent magnet is carried out against the resetting device in case of magnetic coupling. A number of resetting devices are known in the prior art. For instance, a spiral spring may act as a resetting device for the above-described rotary disk. If the magnetic coupling between the neighboring transport elements is separated, e.g. by increasing the distance between the transport elements by individual control, the magnetic attractive interaction is more and more decreasing until it falls short of the second predetermined threshold value. The resetting device may here be configured such that a magnetic attractive interaction below the second predetermined threshold value can no longer prevent a returning of the permanent magnet into the original orientation by the resetting device. By mounting a further locking device which is automatically released when the second predetermined threshold value is fallen short of, this returning into the original orientation may happen suddenly when the second predetermined threshold value is fallen short of. The original orientation may here correspond to the orientation of the permanent magnet before magnetic coupling, particularly before the reorientation of the permanent magnet upon approach of the transport elements.

The present invention also provides a transport device for transporting containers in a container treatment system, which comprises at least one first container treatment unit for a first process step, the device comprising:

a transport path, at least one transport element for transporting one or a plurality of containers, which is movably arranged on the transport path, and an open- and/or closed-loop control unit which is configured to move the transport element according to a predetermined motion profile along at least a part of the transport path as part of a stream of transport elements, wherein the transport path and the transport element are configured such that the transport element can be guided in an individually controllable manner along at least the part of the transport path, and wherein the transport path comprises:

a process section on which at least the first container treatment unit is arranged, and a bypass section which is connected to the process section such that the bypass section forms a detour at least of the first container treatment unit.

The same variations and embodiments which have so far been described in connection with the method according to the invention, particularly with respect to the transport path and the transport elements, are also applicable to the transport device according to the invention for transporting containers in a container treatment system.

Specifically, the open- and/or closed-loop control unit may comprise a storage unit in which predetermined motion profiles for a plurality of transport elements can be stored—in response to the containers and/or products to be treated—in the form of a type management. On the basis of the predetermined motion profiles and the positions of the transport elements which are determined, for instance, as part of an initialization routine of the transport device and/or by means of a plurality of the above-described sensors arranged along the transport path, the open- and/or closed-loop control unit can move the plurality of transport elements, which include the at least one transport element, with a desired displacement-time profile and a desired division of the formed stream of transport elements along at least the part of the transport path. To this end the transport path may comprise interaction elements as described above, and the transport elements may comprise reaction elements which can be individually controlled by the open- and/or closed-loop control unit. The transport elements can thereby be guided in an individually controllable manner along the part of the transport path.

The part of the transport path comprises at least one process section and one bypass section. The process section has provided thereon at least a first container treatment unit for performing a first process step on the containers transported by the transport elements. In addition, further container treatment units may be arranged, particularly in series, along the process section, the units being configured to carry out successive process steps for the treatment of the containers. Specifically, the process section may connect a feed conveyor, for instance in the form of an inlet star wheel, via a plurality of container treatment units to a removal conveyor, for instance in the form of an outlet star wheel. The bypass section is here designed such that it forms a detour at least of the first container treatment unit. To this end the bypass section may be connected upstream and downstream of the first container treatment unit, each time via preferably switchable switch points, to the process section. The bypass section may here be expanded such that it forms a detour for two or more container treatment units. Specifically, the bypass section may respectively be connected upstream and downstream of a plurality of container treatment units via preferably switchable switch points to the process section, thereby enabling both individual bypassing of individual treatment units and bypassing of groups of treatment units.

The switchable switch points can be switched by means of the open- and/or closed-loop control unit according to the respective motion profile of the transport elements. As has been described above, the motion profiles of the transport elements can be flexibly adapted by the open- and/or closed-loop control unit in response to a treatment state of the container carried along and/or to a treatment state of the treatment units. One or more transport elements can thereby flexibly bypass one or more treatment units, for instance in case of failure of a treatment unit According to a development the transport device may further comprise a buffer section which is connected to the process section and/or the bypass section such that the transport element can be stored at least temporarily on the buffer section. The buffer section can thus also belong to the part of the transport path along which the transport element can be guided in an individually controllable manner. The buffer section may be connected via a preferably switchable switch point to the process section and/or the bypass section. The buffer section may be formed as a dead end from which the buffered transport elements can be guided back to the process section and/or bypass section, for instance, after restart of a failed container treatment unit, according to the first in, last out principle. Alternatively, however, the buffer section may also be formed as a loop which is connected via preferably switchable switch points at two points to the process section and/or the bypass section. In this case transport elements stored along the buffer section are returned to the process section and/or bypass section according to the first in, first out principle. The returning operation can here be carried out in a reverse mode of the bypass section while at the same time regularly treated containers are guided into the original direction along the process section.

As has already been described above, the open- and/or closed-loop control unit may be configured such that it adapts the motion profile of at least one transport element to be buffered in such a manner that the transport element is ejected out of the process section onto the buffer section and is stopped there. The buffering duration may here be predetermined by the open- and/or closed-loop control unit or flexibly extended until receipt of a release signal from a container treatment unit causing the buffering action. Buffering, as has been described above, may particularly be necessitated because of a deviation of a current operational state of a container treatment unit from a predetermined desired operational state of the container treatment unit, for instance because of a reduced throughput of containers or a total failure of the treatment unit. Temporary malfunctions of a treatment unit and variations in the throughput of containers can be compensated by buffering transport elements along the buffer section. It goes without saying that the transport device may comprise a plurality of buffer sections, particularly at least one respective buffer section per container treatment unit.

The buffer section, however, may also be formed as part of the bypass section. Container treatment units positioned upstream of the container treatment unit causing the buffering action can thereby continue to run until exhaustion of the buffer capacity of the bypass section so as to reduce loss of production time. If one or some of the succeeding process steps can be carried out, as has been described above, independently of the process step of the failed treatment unit, the bypass section can also be used for supplying the transport elements to the corresponding treatment units not before the performance of these process steps to subsequently supply them again after restart of the failed treatment unit to said unit. By using at least a part of the bypass section as the buffer section, the constructional size of the total transport device can be reduced considerably as no separate buffer sections have to be provided. Moreover, with the help of a bypass section connected at corresponding places to the process section, a flexible sequence of the process steps of a process line can be implemented. This helps to reduce not only production losses, but also to flexibly treat different containers and/or products without the need for modifying the transport device.

According to a further development the bypass section and/or the buffer section may be configured such that the transport element can be guided in both directions. This can e.g. be implemented by means of the above-described interaction elements and reaction elements, wherein the interaction elements and/or reaction elements can be controlled differently depending on the motion direction. Corresponding motion profiles can be stored in a storage unit of the open- and/or closed-loop control unit. An operation of a buffer section in the opposite direction may e.g. be needed for emptying the buffer section and reintroducing the buffered transport elements into the process section. An operation of the buffer section in the opposite direction, i.e. in the reverse mode, may help to return containers which have not been treated yet with respect to a specific process step, into a corresponding container treatment unit.

According to a development the transport device may further comprise an inspection unit which is configured to determine a treatment state of a container carried along by the transport element. The inspection unit is preferably arranged upstream of the first container treatment unit. It goes without saying that per treatment unit a corresponding inspection unit can be arranged upstream of the respective container treatment unit. As has been described above, such an inspection unit may e.g. be configured in the form of a light barrier, e.g. for checking a fill level of a container. Likewise, the inspection unit may comprise a measuring device for determining the weight of a container carried along, whereby both fill level and gross damage can be detected. Furthermore, an optical control unit, for instance as an optical scanner or camera with downstream image processing, is conceivable to detect e.g. damage to the container or applied labels or flaws of the imprinted print images. A plurality of further inspection units are known in the prior art.

The treatment state of the container carried along can be determined during passage of the transport element on the inspection unit and, moreover, transmitted via cable connection or wirelessly as an encoded signal to the open- and/or closed-loop control unit. Specifically, each container which is supplied to the container unit for treatment in the infeed can thus be tested before reaching the treatment unit in such a manner that the process step to be carried out can be carried out in the treatment unit with success. Specifically, defective containers can be recognized in good time and treated accordingly. As has been described above, a corresponding treatment may consist in that the open- and/or closed-loop control unit upon receipt of a corresponding signal from the inspection unit adapts the predetermined motion profile of the transport element in response to the determined treatment state. For instance, containers recognized to be defective can be unloaded from the respective transport element and/or ejected together with the respective transport element via a secondary section which is connected downstream of the inspection unit, but upstream of the container treatment unit, to the process section. Here, a part of the bypass section may also act as a secondary section, wherein a suitable removal conveyor for unloading the defective container may be arranged on the secondary section. Moreover, the secondary section may be connected via a return section to the beginning of the process section to reinsert unloaded transport elements into the stream of the transport elements.

Hence, with the present invention it is possible to largely avoid loss of production time in case of failure of a container treatment unit in a process line by automatically adapting the motion profiles of individually controllable transport elements. Moreover, defective containers can be recognized automatically and ejected separated from the regularly treated containers or carried along within the division of the stream. By coupling plural transport elements to form a train with a common motion profile, it is possible to implement a minimal division and a high throughput of containers. Moreover, the constructional size of the transport device can be reduced by use of the bypass section as a buffer section.

Further features and exemplary embodiments as well as advantages of the present invention will be explained in more detail hereinafter with reference to the drawings. It goes without saying that the embodiments are not limited to the scope of the present invention. It further goes without saying that some or all of the further described features can also be combined with one another in a different way.

BRIEF DESCRIPTION OF THE SEVERAL VIEWS OF THE DRAWINGS

FIG. 7b illustrates a locking and a resetting device for the rotatably supported permanent magnet of FIG. 7a.

DETAILED DESCRIPTION OF THE PREFERRED EMBODIMENTS

Figure 8:
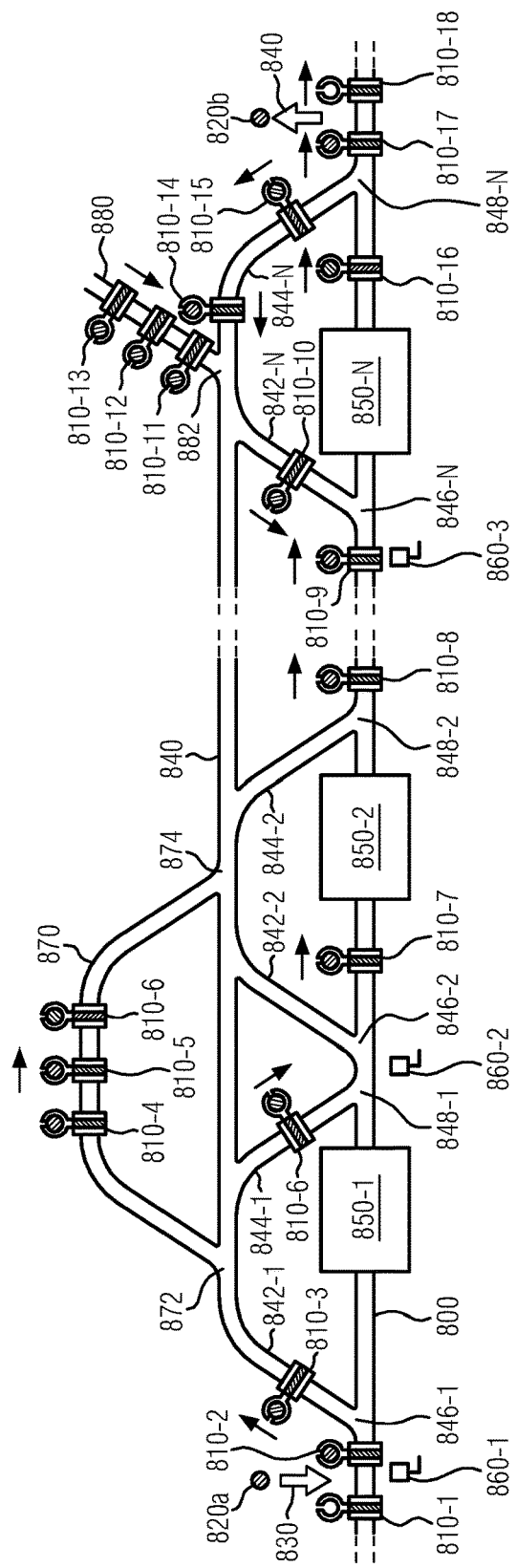
FIG. 8 is a schematic sketch for a transport device for individually controllable transport elements with a bypass section and two buffer sections according to the present invention.

FIG. 8 is a schematic sketch showing an exemplary configuration of a transport device with a bypass section and at least one buffer section according to the present invention. A plurality of individually controllable transport elements, of which individual transport elements 810-1 to 810-18 are here shown by way of example with exemplary motion profiles at a specific time, are moved by means of an open- and/or closed-loop control unit of the transport device (not shown) along the transport path. The transport elements are here moved by individual control of the interaction elements of the transport path and/or of the reaction elements of the transport elements along individual routes at individual predetermined speeds, i.e. according to individual motion profiles.

In addition to a process section 800, the transport path which is here illustrated in an exemplary configuration has a common bypass section 840 of all container treatment units 850-1 to 850-N of the process line, and at least a first buffer section 870 and a second buffer section 880. The process section 800 connects a receiving point 830 via a plurality of container treatment units 850-1 to 850-N, which are here arranged in series in an exemplary manner, to a discharge point 840. An unloaded transport element 810-1 receives a container 820 at the receiving point 830. Subsequently, the containers 820a are transported by means of the loaded transport elements 810-2, 810-7, 810-8, 810-9, 810-16 and 810-17 along the process section formed by the container treatment units 850-1 to 850-N, where they are normally subjected by the container treatment units to a number of successive process steps for the treatment of the containers. The arrows above the transport elements indicate the directions of movement thereof. The transport element 810-17 transports the container from the last container treatment unit 850-N of the process section to the discharge point 840 where the container 820b now treated is delivered to a discharge conveyor. Subsequently, the transport element 810-18 is again unloaded and can be returned to the receiving point (here not shown).

During normal operation, i.e. when the operational states of all container treatment units 850-1 to 850-N correspond to the respective desired operational states, the motion profiles of the transport elements transporting the containers are in general predetermined by the open- and/or closed-loop control unit such that the transport elements are guided along the process section 800 without being discharged onto the bypass section 840 or one of the buffer sections 870 and 880, respectively. The illustrated configuration of the motion profiles shows, however, a situation in which the first container treatment unit 850-1 has failed for instance because of a technical defect. A corresponding deviation of the operational state of the treatment unit 850-1 from the predetermined desired operational state was communicated to the open- and/or closed-loop control unit. As a consequence, the motion profiles of the transport elements 810-3 and 810-6 were adapted automatically by the open- and/or closed-loop control unit such that they bypass the treatment unit 850-1 on a part of the bypass section 840. To this end the transport elements are ejected upstream of the treatment unit 850-1 by means of a switchable switch point 846-1 out of the process section 800 and are supplied via an outlet section 842-1 to the common part of the bypass section. Subsequently, the transport elements are again supplied via an inlet section 844-1 and a switchable switch point 848-1 to the process section from where they are passed on to the second container treatment unit 850-2. Hence, a bypass for the failed container treatment unit 850-1 can be easily formed by adapting the motion profiles of the transport elements 810-3 and 810-6, including switching the respective switch points 846-1 and 848-1.

Alternatively or in addition, at least some of the transport elements 810-4, 810-5 and 810-6 can be channeled to a first buffer section 870. The buffer section 870, which is here shown by way of example, is connected in the form of a loop via switchable switch points 872 and 874 to the bypass section 840. The motion profiles of the transport elements 810-4, 810-5 and 810-6 can be adapted by the open- and/or closed-loop control unit such that the transport elements are stopped on the buffer section 870 and are buffered there for a predetermined period of time. After restart of the failed treatment unit 850-1 the buffered transport elements can be returned either via the switch point 872 or the switch point 874 to the bypass section 840. From there they can be further guided in the reversing mode of the bypass section 840 via the outlet section 842-1 and the switch point 846-1 into the infeed to the treatment unit 850-1, so that the missing process step can be carried out on the containers carried along. When the bypass section 840 and/or the buffer sections 870 and 880, respectively, are provided with a linear drive, the transport elements can be guided along the respective section in both directions. The corresponding motion profiles can be adapted automatically by the open- and/or closed-loop control unit. For instance, an evacuation of the buffer section 870 and a reversing mode of the bypass section 840 can be initiated for instance by a signal from the container treatment unit 850-1, which signal signalizes the state of readiness thereof.

Such a reversing mode of the bypass section 840 is shown by way of example in the right part of the figure. The transport elements 810-11, 810-12 and 810-13 were here buffered along the buffer section 880 at a time at which the container treatment unit 850-N was at a standstill. The buffer section 880, which is here shown by way of example, is formed as a dead end and is connected via a switchable switch point 882 to the bypass section 840. A buffer section which is configured as a dead end must necessarily be operable in both directions. After restart of the treatment unit 850-N the bypass section 840 in the area of the treatment unit 850-N is operated in the reversing mode by adapting the motion profiles of the transport elements 810-10, 810-14 and 810-15. It should be noted that the reversing mode, as has been described above, can be implemented by suitable control of the interaction elements of the bypass section and/or the reaction elements of the transport elements. Especially a part of the bypass section can be operated in the reversing mode while another part of the bypass section is further operated in the normal mode.

The transport elements 810-10, 810-14 and 810-15 are thus returned by adaptation of their motion profiles to the infeed to the treatment unit 850-N in order to be subjected to the still missing treatment. Moreover, the motion profiles of the transport elements 810-11, 810-12 and 810-13, which are buffered along the buffer section 880, are also adapted such that they can be inserted into the stream of the returned transport elements 810-10, 810-14, and 810-15 via the switch point 882. Hence, a temporary failure of the container treatment unit 850-N can be compensated by buffering incompletely treated containers along the buffer path 880.

Apart from a common part extending in parallel with the process section 800, the bypass section 840, which is here shown by way of example, comprises separate detours for each individual container treatment unit 850-1 to 850-N. The detours respectively comprise an outlet section 842-1 to 842-N which is connected via a switchable point 846-1 to 846-N to the process section 800, as well as an inlet section 844-1 to 844-N which is connected via a switchable point 848-1 to 848-N to the process section 800. The configuration which is here shown is however not restrictive in any way because very different combinations of bypass sections and/or buffer sections are conceivable according to the invention. Depending on the layout, a flexible sequence of the process steps carried out by the container treatment units 850-1 to 850-N can be implemented by correspondingly adapting the motion profiles of the transport elements. Thus a product change can be carried out solely by adapting the motion profiles and without any complicated alteration of the transport device.

Furthermore, the transport device as is here shown comprises exemplary inspection units 860-1 to 860-3 which are arranged upstream of the respective container treatment unit 850-1 to 850-N. As has been described above, the respective inspection unit determines a treatment state of the entrained containers during passage of the transport element, especially with respect to a process step carried out last. Insufficiently treated containers or defective containers can be ejected automatically out of the stream of transport elements by adapting the motion profile of the respective transport element. The bypass section 840 can also be used for this purpose. A removal conveyor (not shown) may e.g. be arranged along the bypass section for unloading defective containers. Moreover, the bypass section 840 itself may also serve as a buffer section, and a buffering operation may for instance be carried out on the sub-sections between the inlet sections and the subsequent outlet sections, e.g. between 844-1 and 842-2. The bypass section 840 thereby forms a multifunctional section which, depending on the motion profile of the respective transport element, fulfills different tasks. Thus, the construction size of the transport device can be reduced considerably.

Figure 1A:
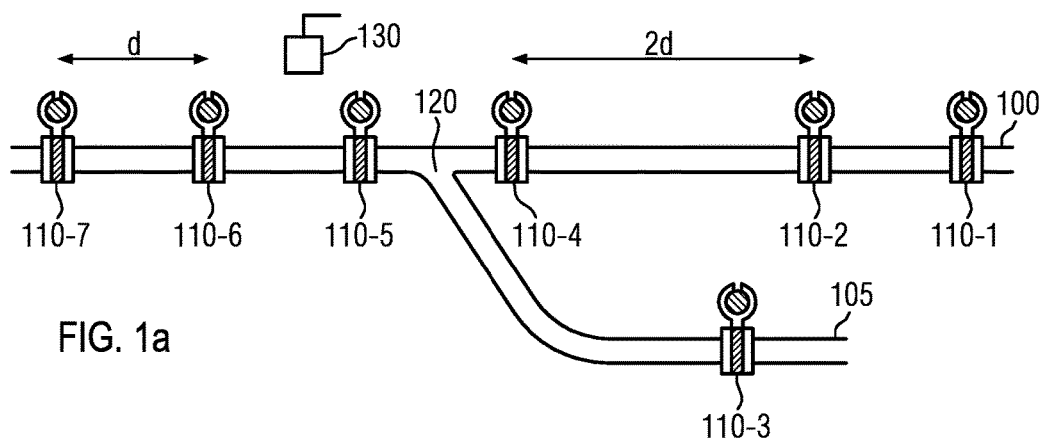
FIG. 1a is a schematic illustration of a system for reducing the distance between two neighboring transport elements after ejection of a transport element according to the present invention, but without reduction of the distance between the two neighboring transport elements.
Figure 1B:
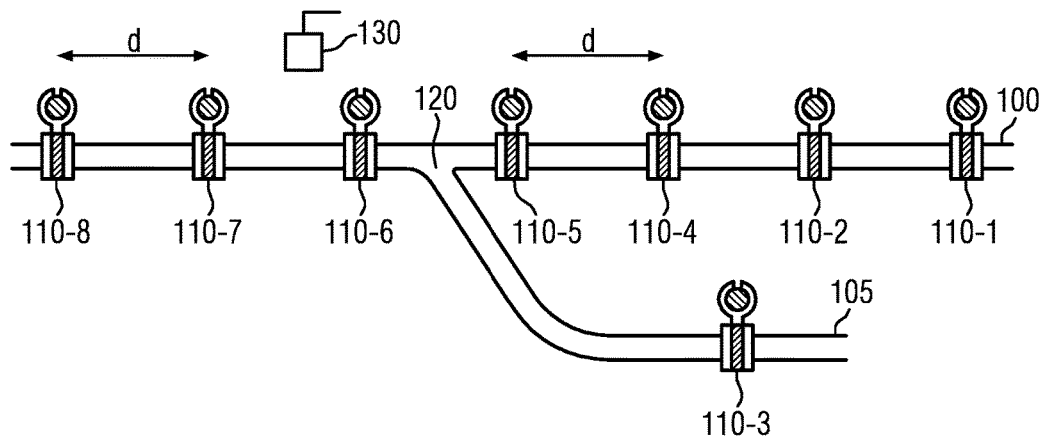
FIG. 1b is a schematic illustration of the system of FIG. 1a, illustrating shorter distance between two neighboring transport elements.

FIG. 1 and FIG. 1b schematic illustration of a system for reducing the distance between two neighboring transport elements after ejection of a transport element according to the present invention. The two partial views show a part of the transport path without reduction of the distance (FIG. 1a) and with reduction of the distance according to the invention (FIG. 1b). The illustrated part of the transport path consists in this exemplary, non-restrictive example of a main branch 100 along which a product stream or a stream of transport elements 110-1 to 110-8 for transporting containers with a predetermined division d, i.e. with a predetermined distance between neighboring transport elements, flows as part of a process section, i.e. between two container treatment units, and a secondary branch 105 which branches off from the main branch 100 by means of a switch point 120.

The secondary branch 105 may here serve the ejection of transport elements with defective containers, or also a division of the product stream, for instance, in order to be able to perform a next product step in parallel-arranged container treatment units with a higher total throughput. In the event that transport elements with defective containers are ejected, the transport path comprises, upstream of the switch point 120, an inspection unit 130 which is configured such that it can detect defective containers which are guided past the inspection unit by means of the transport elements. Such an inspection unit 130 may for instance be based on an optical, acoustic and/or mechanical method for checking a treatment state of the containers passed by. Upon detection of a defective container the inspection unit 130 sends a corresponding signal to an open- and/or closed-loop control unit of the transport device which in response to the receipt of such a signal ejects the transport element 110-3 transporting the defective container out of the main branch 100 by adapting the motion profile thereof and particularly by controlling the switch point 120.

By ejection of the transport element 110-3, a gap is formed between the preceding transport element 110-2 and the succeeding transport element 110-4 in the form of a distance 2d which is doubled by comparison with the division (see upper partial view). According to the present invention this gap, which may pose problems in a subsequent container treatment unit, is however closed by adapting the motion profiles of the transport elements 110-2 and 110-4, as has been described above. In a special development the transport element 110-4 can for instance be accelerated temporarily by the open- and/or closed-loop control unit of the transport device in such a manner that, by comparison with the transport element 110-2, it will catch up until reaching division d (see lower partial view). To keep the distance constant between the moving-up transport element 110-4 and its successor 110-5 at the predetermined division, all of the succeeding transport elements 110-5 to 110-8 can also be accelerated temporarily by the open- and/or closed-loop control unit in that the motion profiles thereof are also adapted. Due to a brief increase in a throughput of the upstream container treatment unit(s) the original gap in the production stream can also be closed permanently with respect to the total throughput of the container treatment system per time unit. The achieved time delay between the moving together of the two transport elements 110-2 and 110-4 and the increase in the throughput of upstream container treatment units has a positive effect on the flexibility and controllability of the total container treatment system.

Figure 2A:
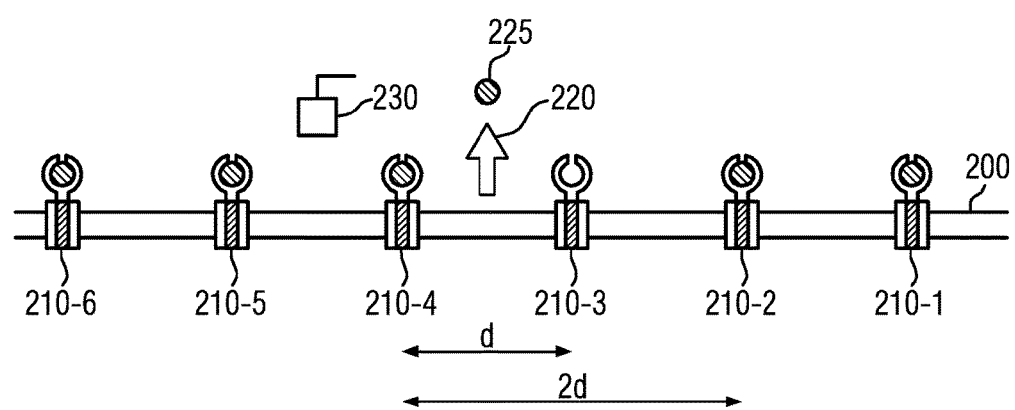
FIG. 2a is a schematic illustration of a system for bringing three neighboring transport elements together after discharge of a defective container from the middle transport element according to the present invention, but without reduction of the distance between the three neighboring transport elements.
Figure 2B:
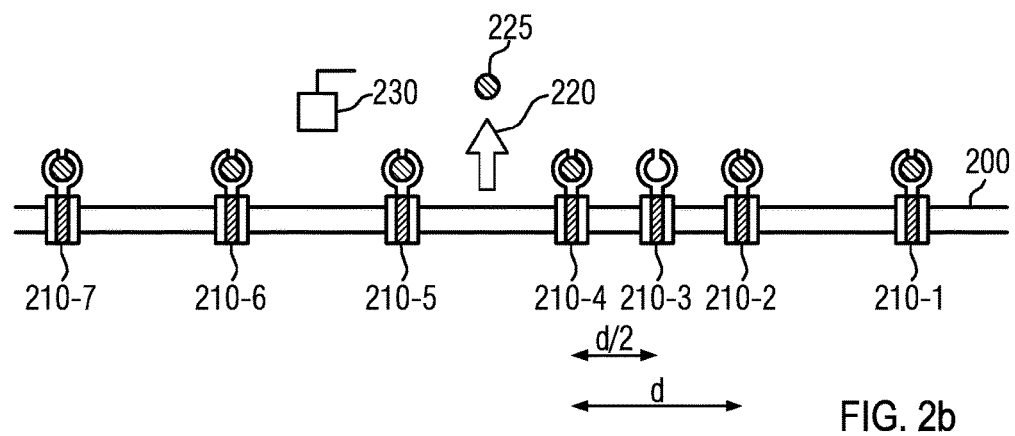
FIG. 2b is a schematic illustration of the system of FIG. 2b, illustrating shorter distance between the three neighboring transport elements.

FIGS. 2a and 2b correspond to FIGS. 1a and 1b, with respect to illustrating closing a resulting gap according to the present invention, wherein the gap of the size 2d in FIG. 2 is not formed by ejection of a transport element, but by unloading a transport element 210-3 from one or more defective containers 225 at a discharge point 220. Thus FIGS. 2a and 2b only illustrate the product stream as a stream of transport elements 210-1 to 210-7 along a main branch 200 of the transport path. An inspection unit 230 at a checkpoint of the transport path checks the containers passed by and detects defective containers which are discharged at the discharge point 220 from the corresponding transport element 210-3 to a removal conveyor.

However, contrary to the method shown in FIGS. 1a and 1b, the transport element 210-3 from which the container has now been removed is still moved on in the stream of transport elements between the transport element 210-2 and 210-4. Hence, without a reduction of the distance between the transport elements 210-2 and 210-3 and 210-3 and 210-4, respectively, the distance between two neighboring transport elements with flawless containers would be 2d in the case of the transport elements 210-2 and 210-4, which would correspond to the double division.

With the method according to the invention for adapting the motion profiles of the transport elements 210-2 to 210-4, the respective distance between the preceding loaded transport element 210-2 and the succeeding unloaded transport element 210-3 or between the preceding unloaded transport element 210-3 and the succeeding loaded transport element 210-4 can be reduced to half d/2 of the predetermined division d. Thus the transport elements transporting the flawless containers enter with the predetermined division d into a downstream container treatment unit after closing of the gap. The unloaded transport element 210-3 is skipped by the container treatment unit calibrated to the product stream division d and does thus not impede the throughput of the container treatment unit.

For instance, the predetermined division d of a product stream of bottles to be treated may be 100 mm. By contrast, after the inventive closing of the gap created by the unloading of the transport element 210-3 and by adapting the motion profiles of the involved transport elements, the distance between neighboring transport elements 210-2 and 210-3 and 210-3 and 210-4, respectively, is just 50 mm. The unloaded transport element 210-3 can thus be carried along in the product stream until the next possible ejection without interfering with the sequence of the treatment steps.

As an alternative to the unloading of the defective container 225, the defective container may also remain in the corresponding transport element 210-3 which is then identified by means of the open- and/or closed-loop control unit as a transport element transporting a defective container. This type of identification may here also be carried out by marking the corresponding transport element by means of an identification unit of an electronic or mechanical type, the identification unit being here arranged on the transport element. By marking the corresponding transport element, a downstream identification detection unit can identify the transport element at a later time and possibly eject it out of the product stream.

Figure 3:
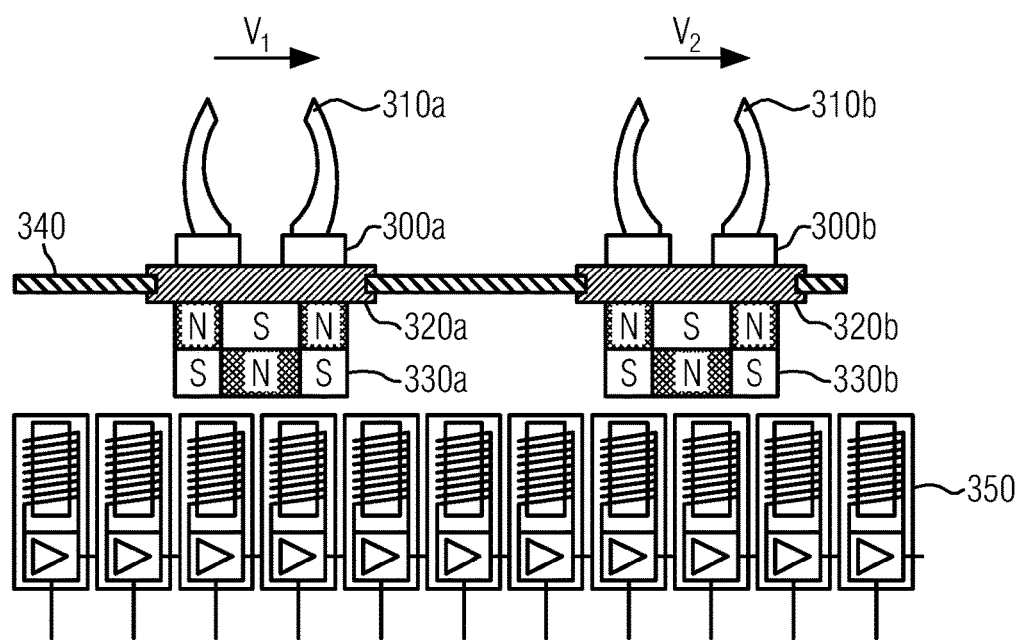
FIG. 3 shows an exemplary configuration of second transport elements and the interaction elements of the transport path.

FIG. 3 shows two neighboring transport elements 300a and 300b by way of example. The present invention, however, is not restricted to the special configuration of the transport elements as is here shown, but is applicable to any type of transport element as long as these transport elements can be guided in an individually controllable manner along a transport path. The transport elements 300a and 300b as are here shown can be guided along the transport path by means of a guide rail 340. The transport elements in this special configuration are here supported by slide bearings 320a and 320b on the guide rail 340. The figure also shows two gripping elements 310a and 310b by means of which the transport elements can receive the containers.

The passive transport elements as shown herein are driven by way of magnetic interaction between the reaction elements 330a and 330b, respectively, of the transport elements and a plurality of electrical windings 350 along the transport path. The electrical windings 350 can here be controlled individually and polarity-reversed singly as electromagnets. Owing to the interaction of the magnetic fields of the electromagnets with the permanent magnets (shown herein) of the transport elements, the transport elements are subjected to the action of a force which with a suitable control of the electromagnets 350 leads to an acceleration, deceleration or constant movement of the transport elements along the guide rail 340. The reaction elements 330a and 330b of the transport elements as are shown herein consist of three permanent magnets that are alternatingly arranged perpendicular to the guide rail, with the width of the middle permanent magnet approximately corresponding to the distance between two neighboring electrical windings of the transport path and the width of the outer permanent magnets respectively corresponding to about half the distance of the neighboring electrical windings. Hence, with an alternating polarity of neighboring electromagnets in the transport path, a maximum force can be exerted on the reaction element along the guide rail. By individual control of the electromagnets 350, the transport elements 300a and 300b can be moved at different speeds $V_1$ and $V_2$ along the guide rail 340. The illustrated magnets which are arranged perpendicular to the guide rail may however also be electromagnets. Hence, individual displacement-time profiles, i.e. motion profiles, of the transport elements 300a and 300b can be implemented by individual control of the electromagnets 350.

Figure 4A:
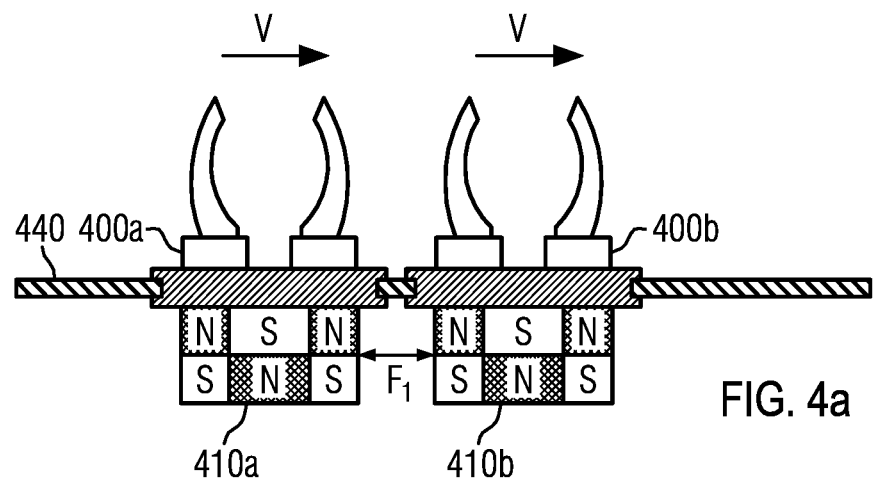
FIG. 4a is a schematic illustration of for the magnetic coupling of two transport elements by reorientation or polarity reversal of magnets, prior to polarity reversal.

In the arrangement of the magnets of the reaction elements as shown in FIG. 3, the reaction elements of directly neighboring transport elements repel each other. Such a repulsive force $F_1$ is shown in FIG. 4a by way of example for the two neighboring transport elements 400a and 400b between the reaction elements 410 and 410b thereof. When the transport elements 400a and 400b guided along the guide rail 440 are drawn together, this repulsive force is continuously increasing, so that a collision of the two transport elements can be avoided due to repulsive interaction. According to the present invention the two transport elements can be magnetically coupled by reorienting or reversing the polarity of one or plural magnets arranged on one of the two transport elements. In the case shown in FIG. 4b, all magnets of the reaction element 410b of the preceding transport element 400b are polarity-reversed or reoriented, so that instead of the repulsive force $F_1$, an attractive force $F_2$ is obtained between the reaction elements 410a and 410b of the two neighboring transport elements. Hence, in the case as is here shown, the magnets of the reaction elements that primarily serve interaction with the transport path for moving the transport elements along the transport path are secondarily used by reorientation or polarity reversal for a magnetic coupling of two or more transport elements. In this case the control of the electrical windings of the transport path in the area of the transport element with the polarity-reversed or reoriented magnets is correspondingly adapted in the open- and closed-loop control unit. It may here be enough to reverse the polarity of or reorient only a part of the magnets of the reaction element as long as the attractive force $F_2$ overcompensates the remaining repulsive force $F_1$. Due to the resulting attraction the two transport elements 400a and 400b will approach each other until they contact each other or can be coupled to each other by additional mechanical coupling elements.

Figure 5A:
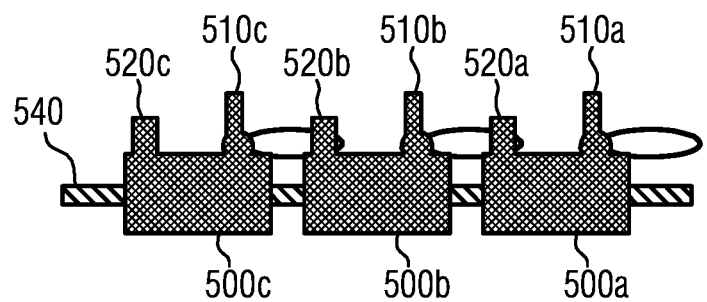
FIG. 5a is a schematic mechanically-coupled transport elements.
Figure 5B:
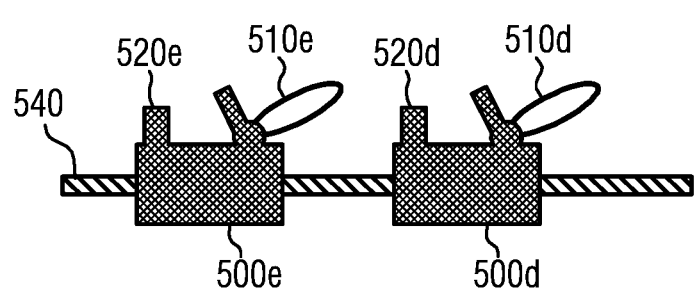
FIG. 5b. is a schematic illustration of two additional transport elements that are not mechanically coupled.

FIGS. 5a and 5b illustrate an alternative or additional coupling of neighboring transport elements by means of mechanical coupling elements. The transport elements 500d and 500e which are here shown by way of example and move along the guide rail 540 have each a controllable, i.e. active, coupling element 510d and 510e, respectively, in the form of a loop and a passive coupling element 520d and 520e, respectively, in the form of a fixed pin which catches the loop of the succeeding transport element.

In the illustrated non-limiting example, neighboring transport elements 500a to 500c can be coupled by shifting, e.g. by lowering, the loop 510b and 510c, respectively, of the respectively succeeding transport element, to a fixed pin 520a and 520b, respectively, of the respectively preceding transport element. In the illustrated case a train of three transport elements is thereby formed, which is moved by individual control of the interaction elements of the transport path in the area of the formed train as a unit. The engaged loop 510b and 510c, respectively, compensates a possible repulsive force between the reaction elements of the neighboring transport elements, so that the train-forming group of transport elements can be moved jointly without any additional energy at the distance which is predetermined by the loop width.

When leaving a process section, a transport element can be disengaged from the mechanical assembly of the train by tilting the loop 510b and 510c, respectively, or the pin 520a and 520b, respectively, in the case of a switchable pin. The control of the active coupling elements 510a to 510e as are here shown by way of example can be carried out by way of a central open- and/or closed-loop control unit of the transport device and/or by way of decentralized open- and/or closed-loop control units mounted on the respective transport elements.

Figure 4B:
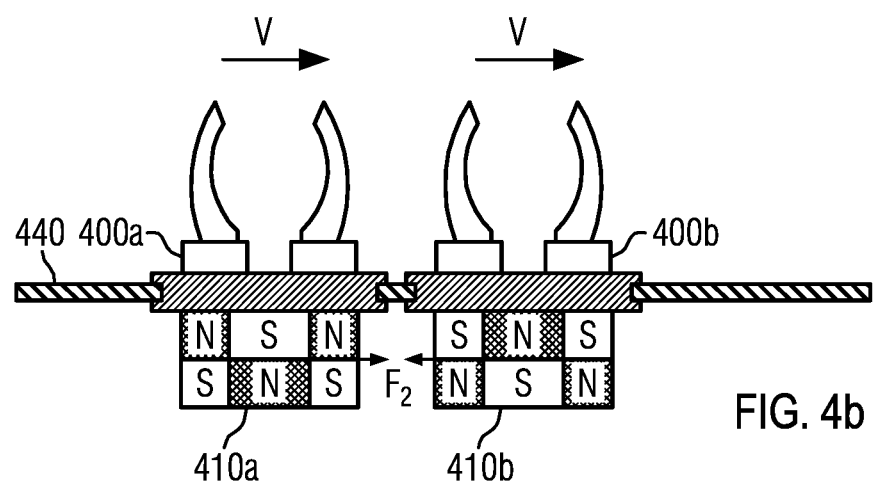
FIG. 4b is a schematic illustration of the magnetic coupling illustrated in FIG. 4a, after polarity reversal.

Moreover, the mechanical coupling shown in FIG. 5a can be combined with the magnetic coupling shown in FIGS. 4a, 4b to enable the neighboring transport elements to approach each other without any additional energy expenditure. After the mechanical coupling has been locked in place, the previously polarity-reversed or reoriented magnets of the one transport element can again be given their original polarity or orientation to simplify the control of the interaction elements of the transport path for jointly guiding the train.

In contrast to the illustration shown in FIGS. 4a, 4b, a magnetic coupling of neighboring transport elements can also be carried out by means of coupling elements in the form of additional magnets which are arranged on the transport elements or the reaction elements thereof and separated from the magnets of the reaction elements, which serve the interaction with the transport path. The separate magnets serving coupling purposes may here be permanent magnets or electromagnets.

Figure 6A:
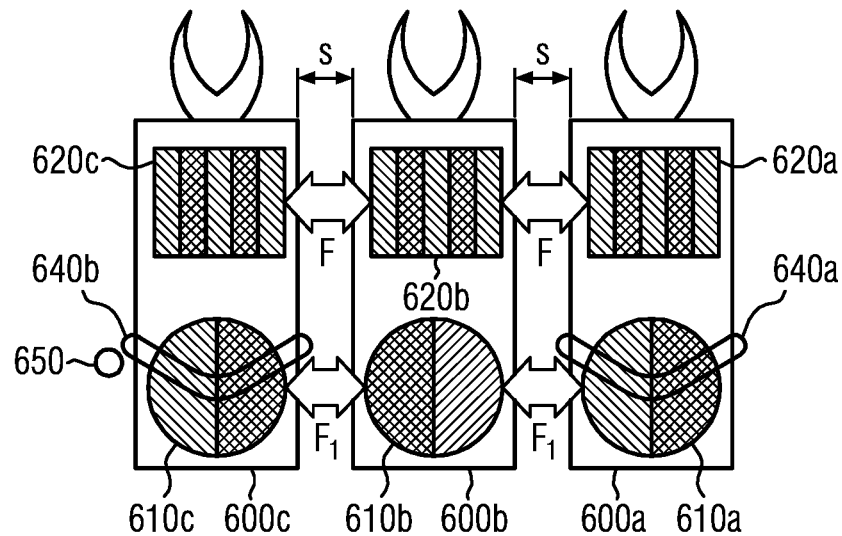
FIG. 6a shows a detailed embodiment of the reaction elements and coupling elements for the magnetic coupling of transport elements, prior to a reversal of polarity.
Figure 6B:
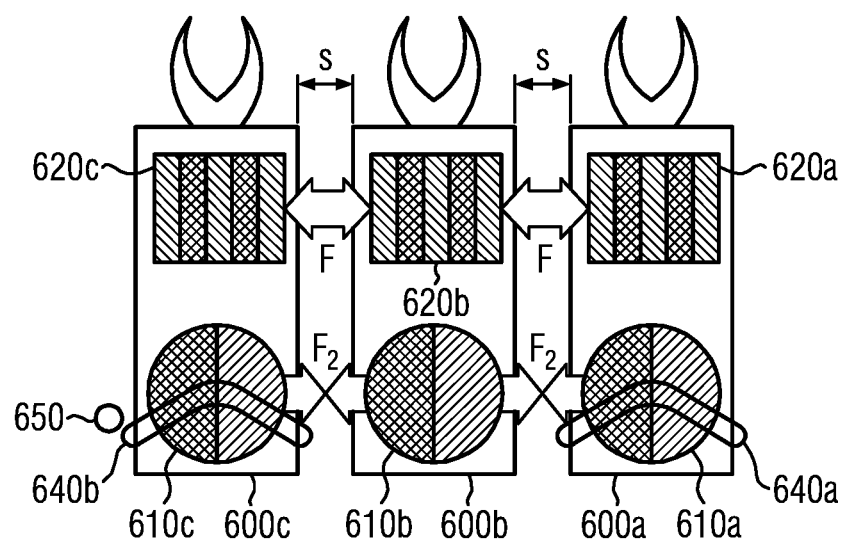
FIG. 6b shows the reaction elements and coupling elements of the transport elements of FIG. 6a. after a reversal of polarity.

In the special non-limiting configuration shown in FIGS. 6a, 6b, each of the transport elements 600a to 600c has separate magnets 610a to 610 serving magnetic coupling—in addition to the magnets 620a to 620 of the reaction element which serve interaction with the transport path. In the illustrated case the permanent magnets of each second transport element 600a and 600c, respectively, which serve coupling purposes, are here rotatably supported with respect to an axis perpendicular to the guide rail, i.e. to the direction of movement of the transport element, on the respective transport element or the reaction element thereof. In return, the permanent magnets 610b of the other transport elements that serve magnetic coupling are firmly arranged on the respective transport element 600b or the reaction element thereof. As an alternative, however, each transport element may also comprise a rotatable magnet serving magnetic coupling. In the case of non-coupled, i.e. individually controllable, transport elements, the permanent magnets or electromagnets serving mechanical coupling may be arranged in alternating fashion such that the poles of neighboring transport elements facing each other have each the same polarity. Thus, in the case of non-coupled transport elements and in addition to a possibly existing repulsive interaction $F_1$ between the magnets 620a to 620c of the reaction elements, which magnets serve interaction with the transport path, an additional repulsive interaction $F_1$ of the magnets serving magnetic coupling exists between neighboring transport elements (see FIG. 6a).

With the help of brackets 640a and 640b mounted on the rotatably supported magnets, a reorientation by 180° can be carried out by guiding the respective transport element 600a and 600c, respectively, past a switchable cam 650 arranged on the transport path, so that instead of the repulsive interaction $F_1$, an attractive interaction $F_2$ does now prevail between the magnets of neighboring transport elements, said magnets serving magnetic coupling (see lower partial figure). The strength of the magnets serving magnetic coupling may here be chosen such that the attractive interaction $F_2$ outweighs the possibly existing repulsive interaction F between the magnets of the respective reaction elements, said magnets serving interaction with the transport path, so that neighboring transport elements 600a and 600b and 600b and 600c, respectively, will further approach one another automatically due to magnetic attraction until they touch each other or are coupled to each other by a mechanical coupling element. In the illustrated example a train of three neighboring transport elements 600a to 600c is formed by reorienting the permanent magnets 610a and 610c.

As has already been described above, the switchable cam may also be arranged in an alternative way on the respective transport elements and, when guided past a corresponding bracket arranged on the transport path, may engage said bracket. As an alternative to the mechanical reorientation of permanent magnets, neighboring transport elements may also be magnetically coupled by reversing the polarity of one of the magnets serving magnetic coupling. As has already been described repeatedly, a central open- and/or closed-loop control unit or decentralized open- and/or closed-loop control units arranged on the transport elements can here control the switching of the cam or the pole reversal of the magnets.

Figure 7A:
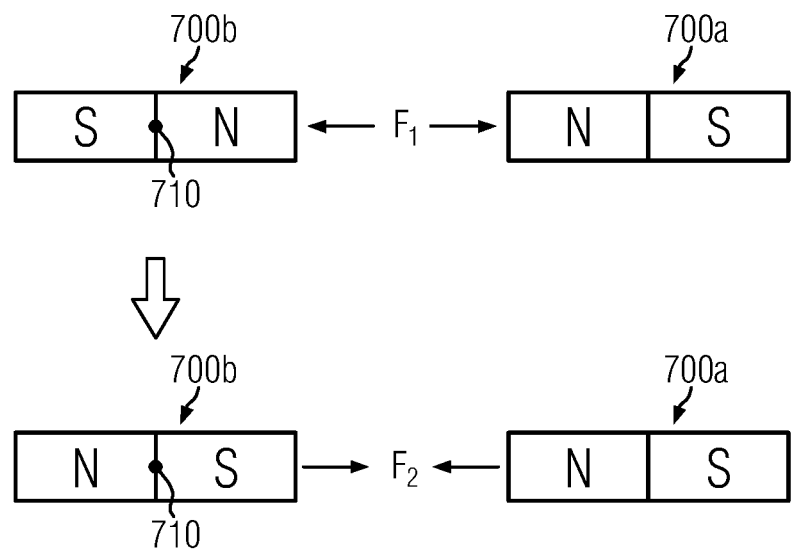
FIG. 7a illustrates the automatic reorientation of a rotatably supported permanent magnet.

As an alternative to the active reorientation, described with reference to FIGS. 6a, 6b, of the permanent magnets serving magnetic coupling by means of a switchable cam, rotatably supported permanent magnets may however also be reoriented automatically solely by two neighboring transport elements approaching each other. Part a) of FIG. 7a shows a sketch of a fixed permanent magnet 700a of a transport element and a permanent magnet 700b of a neighboring transport element which is rotatably supported about the rotational axis 710. In the uncoupled state of transport elements both magnets are subjected to a repulsive interaction $F_1$, as has been described above. However, since permanent magnet 700b is rotatably supported about the axis 710, the repulsive force $F_1$ will augment a small deflection from the original position (here along a horizontal line) and thereby rotate the permanent magnet 700b until the total configuration consisting of permanent magnet 700a and permanent magnet 700b reaches an energetic minimum. This energetic minimum, however, does especially exist in the case of a maximum attractive interaction $F_2$ between the two magnets, which is achieved by complete reorientation of the rotatable magnet 700b. Hence, the repulsive interaction in the uncoupled state can be used for the automatic reorientation of the rotatably supported magnet and for the automatic coupling of the two neighboring transport elements.

Figure 7B:
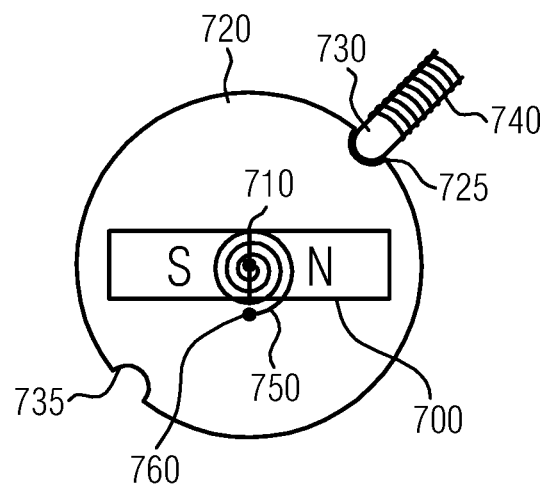

To avoid a situation where an automatic reorientation of the rotatably supported magnets already takes place automatically at a great distance, particularly at the predetermined division of a product stream, i.e. when coupling is not desired, the rotatably supported magnet 700 can be held by a spring-loaded locking device 730 in its original uncoupled orientation. In the exemplary configuration shown in FIG. 7b, the permanent magnet is arranged to this end on a disk 720 which is rotatably supported on the axis 710 and which at one place comprises a recess 725 which is engaged by a bolt 730 of a locking device in the original position of the permanent magnet 700, which position corresponds to uncoupled transport elements. The recess 725 may here be formed such that the locking bolt 730 is preloaded by a spring 740 such that the locking bolt is only released if a predetermined torque on the rotary disk 720 is exceeded, according to a predetermined repulsive force F1, and thereby enables a reorientation of the magnet 700. Exceeding the threshold value for the repulsive interaction $F_1$ corresponds to the falling short of a corresponding predetermined distance of the neighboring transport elements.

In addition to the locking bolt, the rotary disk 720 may comprise a resetting device, e.g. in the form of a spiral spring 750 which is fixed to a point 760 of the rotary disk and to the rotational axis 710. By reorientation of the magnet 700 this spiral spring 750 is tensed such that a resetting torque is exerted on the rotary disk 702. When the attractive force $F_2$ is reduced, for instance by increasing the distance between the neighboring transport elements, the spiral spring which is tensed by reorientation will return the permanent magnet 700 back into the original orientation. To ensure that this returning into the original orientation does not take place gradually, but happens in one step, the rotary disk 720 may comprise a further recess 735 which is engaged by the locking bolt 730 at a maximal attractive force $F_2$, thus in the case of a complete reorientation of the magnet 700. The further recess 735 may here be formed such that the locking bolt 730 is automatically released due to the tension of the spiral spring 750 when a threshold value of the attractive force $F_2$ is not reached.

The present invention is however not restricted to the use of the elements described herein, such as the rotary disk, the locking bolt and the recesses, but can be implemented by means of alternative locking devices and resetting devices that are known in the prior art.

What is claimed is:

1. A method for adapting motion profiles of a plurality of individually controllable transport elements for transporting containers in a container treatment system along a transport path, wherein the plurality of transport elements are movably arranged on the transport path, comprising:
    determining a treatment state of at least one container carried along by a first transport element among the plurality of transport elements,
    wherein the first transport element is moved by means of at least one of an open- or closed-loop control unit of the container treatment system as part of a stream of transport elements,
    wherein a motion profile of the first transport element is adapted by means of the open- or closed-loop control unit in response to the determined treatment state, the motion profile being one of the motion profiles of the plurality of individually controllable transport elements,
    wherein determining the treatment state of the container carried along by the first transport element comprises comparing the determined treatment state with a predetermined desired treatment state, and
    wherein the motion profile of the first transport element in case of a deviation of the determined treatment state from the predetermined desired treatment state is adapted such that a distance of the first transport element from a second transport element directly preceding the first transport element in the stream is reduced to a predetermined distance.

2. The method according to claim 1, wherein the movement of the plurality of transport elements takes place at least in part by magnetic interaction of the respective transport element with the transport path.

3. The method according to claim 1,
    wherein the predetermined distance corresponds to half of a predetermined division of the stream of transport elements along at least a part of the transport path.

4. The method according to claim 1, further comprising unloading the first transport element from the container carried along upon deviation of the determined treatment state from the predetermined desired treatment state.

5. The method according to claim 1,
    wherein the treatment state of the container carried along by the first transport element is determined in an infeed to at least one container treatment unit, and
    wherein the predetermined desired treatment state is predetermined in response to a position of the first transport element along the transport path.

6. The method according to claim 1, wherein the motion profile of the first transport element is not adapted in case of no deviation of the determined treatment state from the predetermined desired treatment state.

7. The method according to claim 1, wherein a position of the first transport element is determined by means of a plurality of sensors, which are arranged along the transport path.

8. The method according to claim 7, wherein in determining the position of the first transport element, the plurality of sensors includes magnetic field sensors.

9. The method according to claim 1, further comprising:
determining an operational state of at least one first container treatment unit which is arranged downstream with respect to a position of the first transport element along the transport path,
wherein determining the operational state of the first container treatment unit comprises comparing the determined operational state with a predetermined desired operational state, and
wherein the motion profile of the first transport element upon deviation of the determined operational state from the predetermined desired operational state is adapted such that the first transport element bypasses the first container treatment unit along a bypass section of the transport path.

10. The method according to claim 9,
wherein the motion profile of the first transport element is further adapted such that the first transport element after bypassing the first container treatment unit is supplied to a second container treatment unit arranged along the transport path downstream of the first container treatment unit.

11. The method according to claim 9,
wherein the motion profile of the first transport element is further adapted such that the first transport element is buffered at least temporarily along the bypass section.

12. The method according to claim 9, further comprising:
determining again an operational state of the first container treatment unit and comparing the operational state determined again with the predetermined desired operational state, and
returning the first transport element to an infeed of the first container treatment unit if the operational state determined again corresponds to the predetermined desired operational state.

13. A method for adapting motion profiles of a plurality of individually controllable transport elements for transporting containers in a container treatment system along a transport path, wherein the plurality of transport elements are movably arranged on the transport path, comprising:
determining a treatment state of at least one container carried along by a first transport element among the plurality of transport elements,
wherein the first transport element is moved by means of at least one of an open- or closed-loop control unit of the container treatment system as part of a stream of transport elements,
wherein a motion profile of the first transport element is adapted by means of at least one of the open- or closed-loop control unit in response to the determined treatment state, the motion profile being one of the motion profiles of the plurality of individually controllable transport elements,
wherein determining the treatment state of the container carried along by the first transport element comprises comparing the determined treatment state with a predetermined desired treatment state,
wherein adapting the motion profile of the first transport element upon deviation of the determined treatment state from the predetermined desired treatment state comprises ejecting the first transport element out of the stream of transport elements, and
wherein the method further comprises adapting a motion profile of at least one of a second transport element directly preceding the first transport element in the stream before ejection of the first transport element, and a third transport element directly succeeding the first transport element in the stream before ejection of the first transport element, in such a manner that a distance of the third transport element from the second transport element is reduced to a predetermined distance.

14. The method according to claim 13,
wherein the predetermined distance corresponds to a predetermined division of the stream of transport elements along at least a part of the transport path.

15. A method for adapting motion profiles of a plurality of individually controllable transport elements for transporting containers in a container treatment system along a transport path, wherein the plurality of transport elements are movably arranged on the transport path, comprising:
determining a treatment state of at least one container carried along by a first transport element among the plurality of transport elements,
wherein the first transport element is moved by means of at least one of an open- or closed-loop control unit of the container treatment system as part of a stream of transport elements,
wherein a motion profile of the first transport element is adapted by means of the open- or closed-loop control unit in response to the determined treatment state, the motion profile being one of the motion profiles of the plurality of individually controllable transport elements, and
further comprising:
determining a treatment state of at least one container carried along by a second transport element among the plurality of transport elements,
adapting at least one of the motion profile of the first transport element or a motion profile of the second transport element in response to the determined treatment states of the entrained containers of the first and second transport element such that a distance of the second transport element from the first transport element is reduced to a predetermined distance,
wherein the first and the second transport element are directly adjacent along the transport path, and
wherein the first transport element is coupled directly to the second transport element when the predetermined distance is reached.

16. The method according to claim 15, wherein the distance is reduced at least in part against a magnetic repulsive interaction between the first and the second transport element.

17. The method according to claim 15, wherein coupling is carried out at least one of mechanically or magnetically.

18. The method according to claim 15, wherein after coupling the first and the second transport element are moved with a joint motion profile jointly along a part of the transport path.

19. The method according to claim 15, wherein coupling is carried out at least in part by reorientation or polarity reversal of one or a plurality of magnets arranged on the first or second transport element.

20. The method according to claim 19, wherein the reorientation is carried out by means of a cam which is switchable by the open- and/or closed-loop control unit, or automatically by means of magnetic interaction between the first and the second transport element.

21. A transport element for transporting at least one container along a transport path, comprising:
at least one support element which is configured such that the transport element can be movably supported on the transport path,
a holding device for holding one or plural containers,
a reaction element which comprises at least one permanent magnet and/or at least one electromagnet, wherein the reaction element is configured such that the transport element can be moved along the transport path by magnetic interaction with the transport path, and
a first coupling element which is configured such that the transport element can be coupled by means of the first coupling element to a first further transport element,
wherein the first coupling element comprises a switchable mechanical coupling element, or
wherein the first coupling element comprises at least one of a permanent magnet, the permanent magnet rotatably supported on the transport element, or an electromagnet, the polarity of which can be reversed by means of an electrical circuit of the transport element.

22. The transport element according to claim 21, further comprising a second coupling element which is configured such that the transport element can be coupled by means of the second coupling element to a second further transport element.

23. The transport element according to claim 21, wherein each of the permanent magnet or the electromagnet is configured as part of the reaction element.

24. The transport element according to claim 21, wherein the permanent magnet can be reoriented by means of a switchable cam.

25. The transport element according to claim 21, wherein the permanent magnet can be reoriented by means of magnetic interaction with the first further transport element.

26. The transport element according to claim 25, further comprising a spring-loaded locking device for locking the permanent magnet, which is configured such that it is automatically released when a first predetermined threshold value of the magnetic interaction with the first further transport element is exceeded.

27. The transport element according to claim 26, further comprising a resetting device which is configured such that it turns the permanent magnet back into an original orientation when a second predetermined threshold value of the magnetic interaction is fallen short of.

28. A transport device for transporting containers in a container treatment system, which comprises at least one first container treatment unit for a first process step, comprising
a transport path,
at least one transport element for transporting one or a plurality of containers, which is movably arranged on the transport path, and
at least one of an open- or closed-loop control unit which is configured to move the transport element according to a predetermined motion profile along at least a part of the transport path as a part of a stream of transport elements,
wherein the transport path and the transport element are configured such that the transport element can be guided in an individually controllable manner along at least the part of the transport path,
wherein the transport path comprises:
a process section on which at least the first container treatment unit is arranged,
a bypass section which is connected to the process section such that the bypass section forms a detour at least of the first container treatment unit, and
wherein the bypass section is configured such that the transport element can be guided in both directions.

29. The transport device according to claim 28, further comprising a buffer section which is connected to at least one of the process section or the bypass section such that the transport element can be stored at least temporarily on the buffer section.

30. The transport device according to claim 29,
wherein the buffer section is configured such that the transport element can be guided in both directions.

31. The transport device according to claim 28, further comprising an inspection unit which is configured to determine a treatment state of a container carried along by the transport element.

32. The transport device according to claim 31,
wherein the inspection unit is configured to communicate the determined treatment state by means of a signal to the at least one of an open- or closed-loop control unit, and
wherein the at least one of the open- or closed-loop control unit is configured to adapt the predetermined motion profile of the transport element in response to the determined treatment state.

* * * * *